US012613854B2

(12) United States Patent
Reichinger

(10) Patent No.: US 12,613,854 B2
(45) Date of Patent: Apr. 28, 2026

(54) SPLIT RETRIEVAL STRUCTURES FOR STORING AND QUERYING DATA

(71) Applicant: Dynatrace LLC, Waltham, MA (US)

(72) Inventor: Julian Reichinger, Sankt Johann am Wimberg (AT)

( * ) Notice: Subject to any disclaimer, the term of this patent is extended or adjusted under 35 U.S.C. 154(b) by 0 days.

(21) Appl. No.: 18/978,653

(22) Filed: Dec. 12, 2024

(65) Prior Publication Data

US 2025/0378059 A1      Dec. 11, 2025

Related U.S. Application Data

(60) Provisional application No. 63/656,649, filed on Jun. 6, 2024.

(51) Int. Cl.
*G06F 16/22* (2019.01)
*G06F 16/245* (2019.01)

(52) U.S. Cl.
CPC ...... *G06F 16/2282* (2019.01); *G06F 16/2228* (2019.01); *G06F 16/245* (2019.01)

(58) Field of Classification Search
CPC ............ G06F 16/2282; G06F 16/2228; G06F 16/245; G06F 16/80; G06F 16/81; G06F 16/83
See application file for complete search history.

(56) References Cited

U.S. PATENT DOCUMENTS

| | | | | |
|---|---|---|---|---|
| 5,966,704 A * | 10/1999 | Furegati | ................ | G06F 16/221 |
| 11,409,695 B2 * | 8/2022 | Gupta | .................... | G06F 16/00 |
| 2010/0169274 A1 * | 7/2010 | Kulkarni | ................ | G06F 16/22 711/216 |
| 2014/0344231 A1 * | 11/2014 | Stowe | ................. | G06F 16/2365 707/693 |
| 2016/0070734 A1 * | 3/2016 | Popov | ................. | G06F 16/2282 707/742 |
| 2021/0357389 A1 * | 11/2021 | Rao | .......................... | G06F 16/13 |
| 2023/0153287 A1 * | 5/2023 | Stephens | ................ | G06F 3/064 707/737 |

* cited by examiner

*Primary Examiner* — James E Richardson

(57) ABSTRACT

A computer-implemented method is presented for storing and querying records from a data segment. The objective of the disclosure is to find computer-implemented methods for storing and querying records from a data segment that are fast and space efficient storing and querying of APM data stored in a segmented database.

26 Claims, 8 Drawing Sheets

Figure 1:
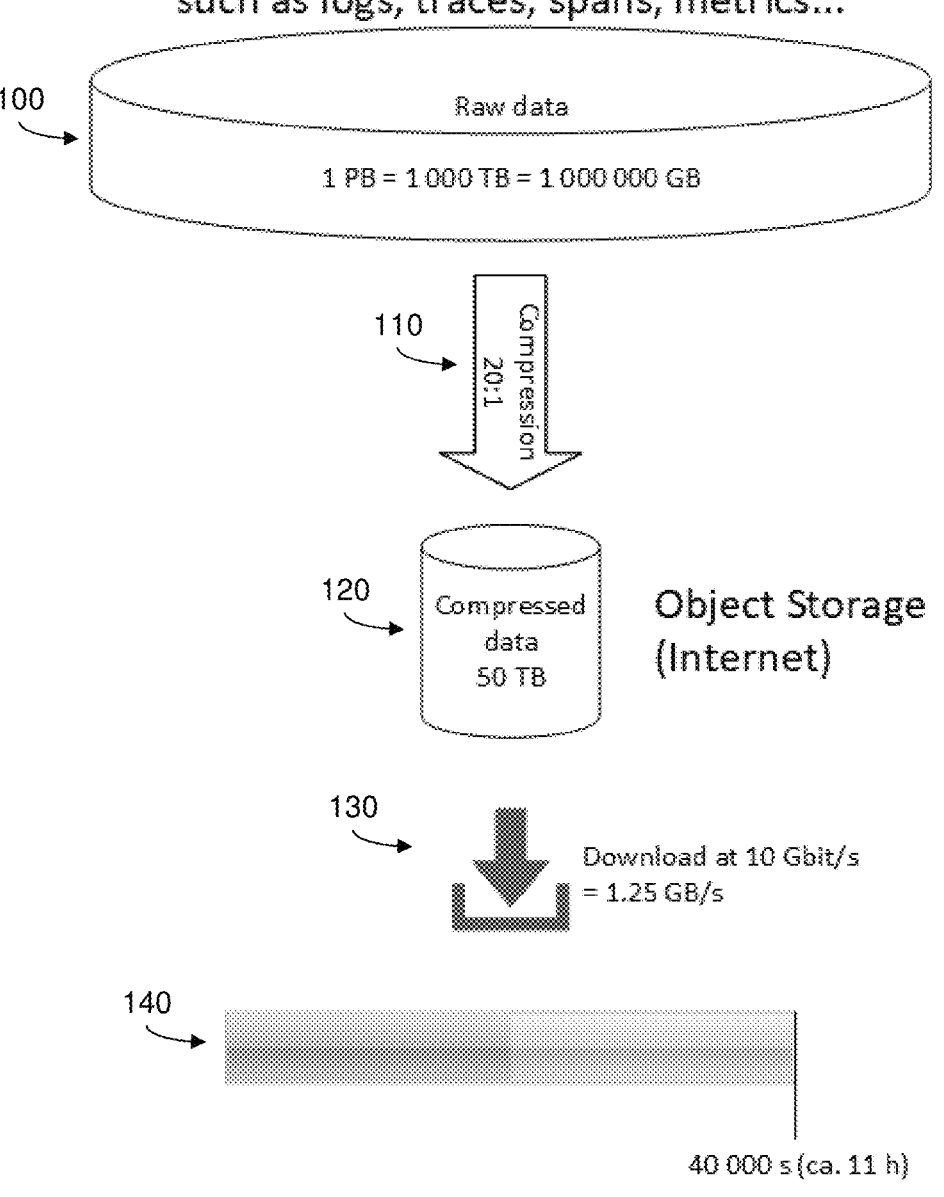

Application monitoring and security data,
such as logs, traces, spans, metrics...

Application monitoring and security data,
such as logs, traces, spans, metrics...

Fig. 6

SPLIT RETRIEVAL STRUCTURES FOR STORING AND QUERYING DATA

CROSS-REFERENCE TO RELATED APPLICATIONS

This application claims the benefit of U.S. Provisional Application No. 63/656,649, filed on Jun. 6, 2024. The entire disclosure of the above application is incorporated herein by reference.

FIELD

The present disclosure relates to the technical field of information technology, in particular to the field of application performance and monitoring (short APM). A first aspect of the disclosure concerns a computer-implemented method for storing records from a data segment. A second aspect of the disclosure concerns a computer-implemented method for querying records from a data segment.

BACKGROUND

The operating systems of computing entities, applications running on the computing entities, computing hosts and computing containers etc. connected to the computing entities, produce application performance and monitoring data, such as log messages, metrics data, entity data etc. thereby documenting the processing of data in the computing environment. In addition, network entities, such as routers, firewalls, switches etc. produce APM data too. In APM technology, massive amounts of application performance, monitoring and security data are stored in a segmented database having multiple data segments. Database queries are e.g., executed to detect and mitigate performance issues, detect suspicious activities, conduct root-cause analysis etc.

This section provides background information related to the present disclosure which is not necessarily prior art.

SUMMARY

As the amount of APM data stored on a database is steadily increasing, there is a need i. to efficiently store records of APM data in a database, and ii. to allow the ultrafast querying of the APM data stored on the database. According to state-of-the-art solutions, data is stored in data segments. Data segments can be organized in a temporal manner, i.e., containing data for a certain time/date period, or according to the origin of the APM data, i.e., containing APM data originating at a certain group of computing entities, applications etc. Also a combination of both is known.

Typically, there exists an index for a data segment thus allowing the fast retrieval of records from the data segment. As potentially many data segments need to be queried, many indexes need to be loaded in order to find matching data in the data segments. Due to the size of APM data, data may be stored in an object storage, such as AWS S3. The object storage itself is typically accessible via the internet. Although the index for a data segment is in some cases a lot smaller than the size of the raw data, a lot of data needs to be downloaded from the internet before querying.

How to improve both the storing of records from a data segment of a database and the querying of records from a data segment of a database is unknown in the art.

In a first aspect of the disclosure, a computer-implemented method for storing records from a data segment shall be found that allows the fast and space efficient storing of APM data stored in a segmented database. Storing shall be fast, and the stored data shall be small.

The technical problem is solved by a computer-implemented method for storing records from a data segment according to claim 1, comprising: receiving, by a computer processor, a data segment comprised of a plurality of data records, where each of the data records in the plurality of data records includes one or more key-value pairs, wherein the plurality of data records is organized into one or more batches, where each of the one or more batches is assigned a batch identifier; defining a data structure having a retrieval section and a data section; for each of the plurality of data records, tokenizing the key-value pairs in a given data record, thereby creating a list of tokens; storing the list of tokens in the retrieval section of the data structure, where each entry in the list of tokens includes a given token and a list of batch identifiers for the batches which contain the given token; compressing data records in each of the one or more batches; and storing the compressed data records for each of the one or more batches in the data section of the data structure.

The data in the database is organized in data segments such that the database typically comprises multiple data segments. Each data segment comprises multiple batches, where each batch contains at least one record. In the first step, a data segment comprising multiple (data) records is received. Each record includes at least one key-value pair, e.g., such as the key-value pair "logline": "authenticating client 81195" in JSON notation, where "logline" is the key and "authenticating client 81195" is the value. The data records in a data segment are organized in batches, where each batch contains at least one record. In order to differentiate batches, each batch is assigned a batch identifier, such as an integer number. In the second step, a data structure having a retrieval section and a data section is defined. This is done for each data segment. In the next step, a list of tokens is created by tokenizing the key-value pairs in all data records. The list of tokens is stored in the retrieval section of the data structure, where each entry in the list of tokens includes a given token and a list of batch identifiers for the batches which contain the given token. Preferably, the list of batch identifiers is a unique list of batch identifiers, such that each unique list of batch identifiers is stored only once in the retrieval section of the data structure. The list of batch identifiers is subsequently also called posting list. The list of tokens and the list of batch identifiers are stored in the retrieval structure, whereas the data records in the batches are stored in compressed form in the data section of the data structure. Compression is typically done lossless such that records contained in a batch can be restored without any loss of information.

In a preferred embodiment, the data structure is used for retrieving at least one of the data records from the data section. This may be done by first receiving an input value; querying the list of tokens for the input value; and outputting a list of batch identifiers corresponding to the token. The list of batch identifiers is a list of batches containing the token.

Advantageously, retrieving further comprises: loading a batch corresponding to the list of batch identifiers; uncompressing the batch; and identifying a record containing a token corresponding to the input value thereby retrieving the record. By doing so, false positives in the batches contained in the list of batch identifiers can be removed from the query result.

By tokenizing the key-value pairs, either (i) a key value, (ii) a field value, or (iii) both (i) and (ii) are tokenized. The selection of what is tokenized can be done on the specific type of APM data.

After tokenizing key-value pairs it is preferred to deduplicate the tokens in the list of tokens. This ensures that only unique tokens are added to the list of tokens such that the list is compact and can be loaded fast.

According to a very preferred embodiment, prior to storing the list of tokens, for each token in the list of tokens the method further includes applying a hash function to the token, thereby creating a list of hashed tokens. Generally, each hashed token has an equal length irrespective of the length of the corresponding token.

According to another very preferred embodiment, the retrieval section includes a first list of tokens having low cardinality and a second list of tokens having high cardinality. Thus, low cardinality tokens are contained in the first list of tokens and high cardinality tokens are contained in the second list of tokens.

The cardinality of a token is determined by considering at least one of (i) a number of records containing the token within the data segment, and (ii) a sample of records from a different data segment.

In a second aspect of the disclosure, a computer-implemented method for querying records from a data segment shall be found that allows the fast querying of huge amounts of APM data in a segmented database. Querying shall be fast and the amount of data loaded for querying shall be small.

The technical problem is solved by a computer-implemented method for querying records from a data segment according to a claim, comprising: receiving, by a computer processor, a value for a query of a data segment comprised of a plurality of data records, where each of the data records in the plurality of data records includes one or more key-value pairs, the plurality of data records is organized into one or more batches and each of the one or more batches is assigned a batch identifier; loading a first list of tokens from a membership section of a data store; determining whether the value from the query is present in the first list of tokens; loading a first list of batch identifiers from a posting section of the data store in response to a determination that the value from the query is present in the first list of tokens; identifying a first posting list in the first list of batch identifiers from the posting section, where the first posting list are for batches which contain the value from the query; loading at least one batch identified in the first posting list of batch identifiers from a data section of the data store; uncompressing the at least one batch; identifying a record having a token matching the value in the at least one batch; and outputting the record.

In the first step, a value for a query is received. The value can be a hash value or an unhashed value. After this, a first list of tokens from a membership section of the retrieval structure for the data segment to be queried is loaded from a data store. The data store may be an object storage located on the internet. After loading the first list of tokens, it is determined whether the value is present in the first list of tokens. If the value was found to be present in the first list of tokens, a first list of batch identifiers is loaded from a posting section of the data store. After this, a first posting list is identified in the first list of batch identifiers from the posting section, where the first posting list are for batches which contain the value from the query. Next, at least one batch is loaded identified in the first posting list and the at least one batch is uncompressed. In the uncompressed batch, the at least one record comprising the value from the query is identified and following that, the record is output.

Typically, also the first posting list containing batch identifiers matching the value of the query is output to a user. The user can be a human operator or a database user, i.e., another software component initiating the query.

After querying one data segment, typically another segment is retrieved and the query is continued for the other data segment.

In case the value from the query is a string, the string is received, the string is split into two or more values, and the query is performed for each of the two or more values. In case the values in the string are combined by the AND operator, an intersection of the posting lists identified for each value is formed and output to the user. Alternatively, if the values in the string are combined by the OR operator, the individual posting lists identified for each value are added together and output to the user.

The key-value pairs include one of (i) a key value, (ii) a field value, or (iii) both (i) and (ii).

In case the retrieval structure is a probabilistic data structure, the method further includes applying a hash function to the value, thereby creating a hashed value, and wherein the first list of tokens includes hashed tokens.

In case the retrieval structure is split into low and high cardinality sections, the membership section includes a second list of tokens, and wherein the first list of tokens have low cardinality and the second list of tokens have high cardinality. The cardinality of a token is determined by at least one of (i) a number of records within the data segment, and (ii) a sample of records from a different data segment.

In the aforementioned case, the method further comprises: loading the second list of tokens in response to a determination that the value from the query is absent in the first list of tokens; determining whether the value from the query is present in the second list of tokens; loading a second list of batch identifiers from the posting section of the data store in response to a determination that the value from the query is present in the second list of tokens; identifying a second posting list in the second list of batch identifiers from the posting section, where the second posting list are for batches which contain the value from the query; loading at least one batch identified in the second posting list of batch identifiers from the data section of the data store; uncompressing the at least one batch; identifying a record having a token matching the value in the at least one batch; and outputting the record.

The objective technical problem is also solved by a computer-implemented method for querying records from a data segment according to a claim, comprising: receiving, by a computer processor, a value for a query of a data segment comprised of a plurality of data records, where each of the data records in the plurality of data records includes one or more key-value pairs, the plurality of data records is organized into one or more batches and each of the one or more batches is assigned a batch identifier; loading a first list of tokens from a low cardinality section of a data store, where tokens in the first list of tokens represent values in data records having low cardinality and each entry in the first list of tokens includes a given token and a list of batch identifiers for the batches which contain the given token; determining whether the value from the query is present in the first list of tokens; retrieving a particular list of batch identifiers from the first list of tokens, where the particular list of batch identifiers corresponds to a token matching the value from the query; retrieving one or more data records from a data section of the data store using the particular list of batch identifiers, where the retrieval of the one or more data records is in response to a determination that the value from the query is present in the first list of tokens; and loading a second list of tokens from a high cardinality section of the data store in response to a determination that the value from the query is absent in the first list of tokens, where tokens in the second list of tokens represent values in data records having high cardinality.

Preferably, retrieving the one or more data records from the data section comprises: loading at least one batch identified in the particular list of batch identifiers corresponding to the token matching the value from the query; uncompressing the at least one batch; identifying a record having a key-value pair matching the value from the query; and outputting the record.

In many cases, the particular list of batch identifiers is output to a user.

Advantageously, the method further comprises: determining whether the value from the query is present in the second list of tokens; retrieving a particular list of batch identifiers from the second list of tokens, where the particular list of batch identifiers corresponds to a token matching the value from the query; and retrieving one or more data records from a data section of the data store using the particular list of batch identifiers, where the retrieval of the one or more data records is in response to a determination that the value from the query is present in the second list of tokens.

As often data can be present in multiple data segments, the method comprises retrieving another data segment and continuing the query with the other data segment.

Key-value pairs can include one of (i) a key value, (ii) a field value, or (iii) both (i) and (ii).

The cardinality of a token is determined by considering at least one of (i) a number of records containing the token within the data segment, and (ii) a sample of records from a different data segment.

In case the value from the query is a string, the method further comprises: splitting the string into a plurality of values; determining whether the each of the values is present in the first list of tokens; loading the second list of tokens in response to a determination that at least one of the values is absent in the first list of tokens; and determining whether the at least one of the values is present in the second list of tokens, and the query is performed in the first list of tokens for each of the values.

Further areas of applicability will become apparent from the description provided herein. The description and specific examples in this summary are intended for purposes of illustration only and are not intended to limit the scope of the present disclosure. After this, it is identified whether the

DRAWINGS

The drawings described herein are for illustrative purposes only of selected embodiments and not all possible implementations, and are not intended to limit the scope of the present disclosure.

Figure 2:
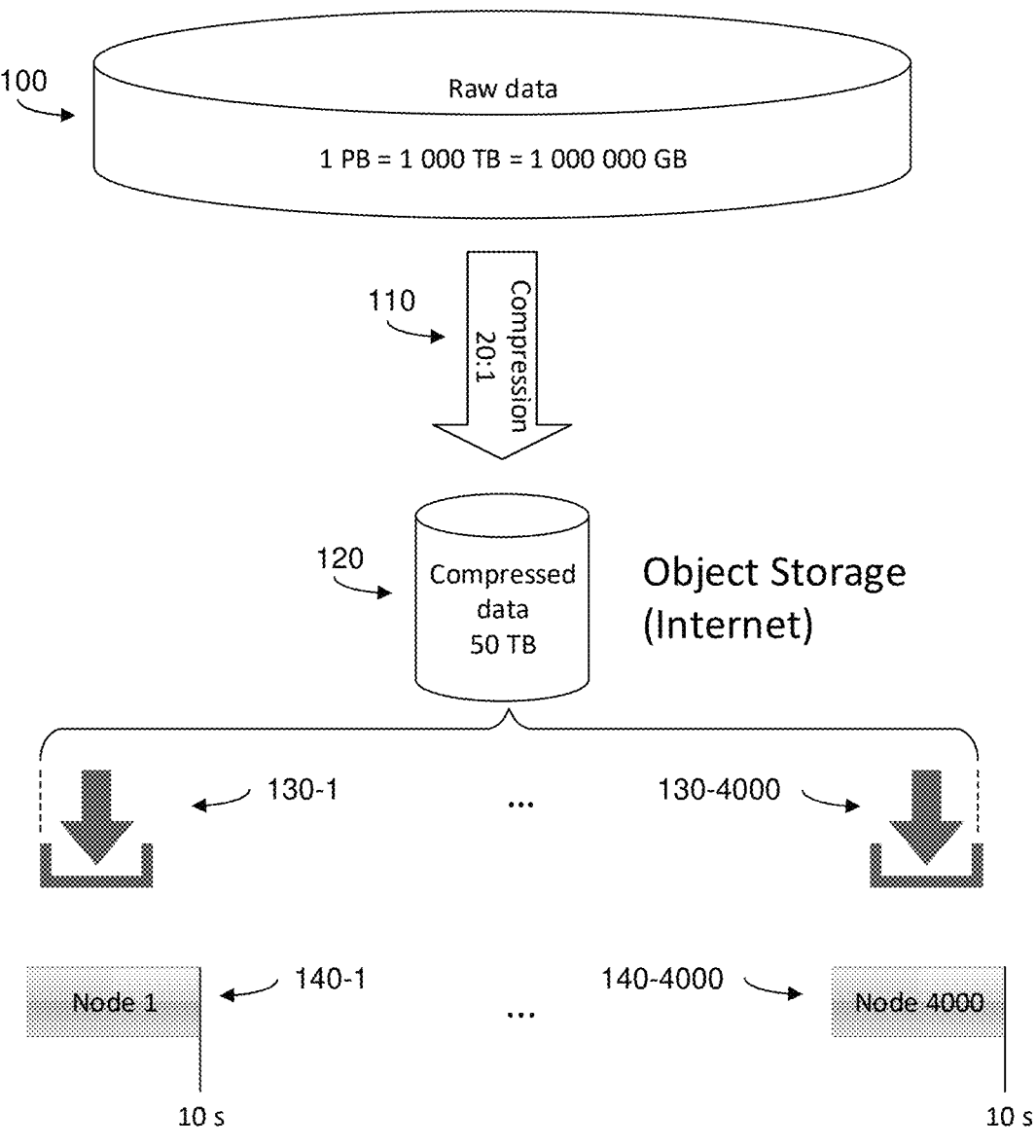
Figures 3, 4:
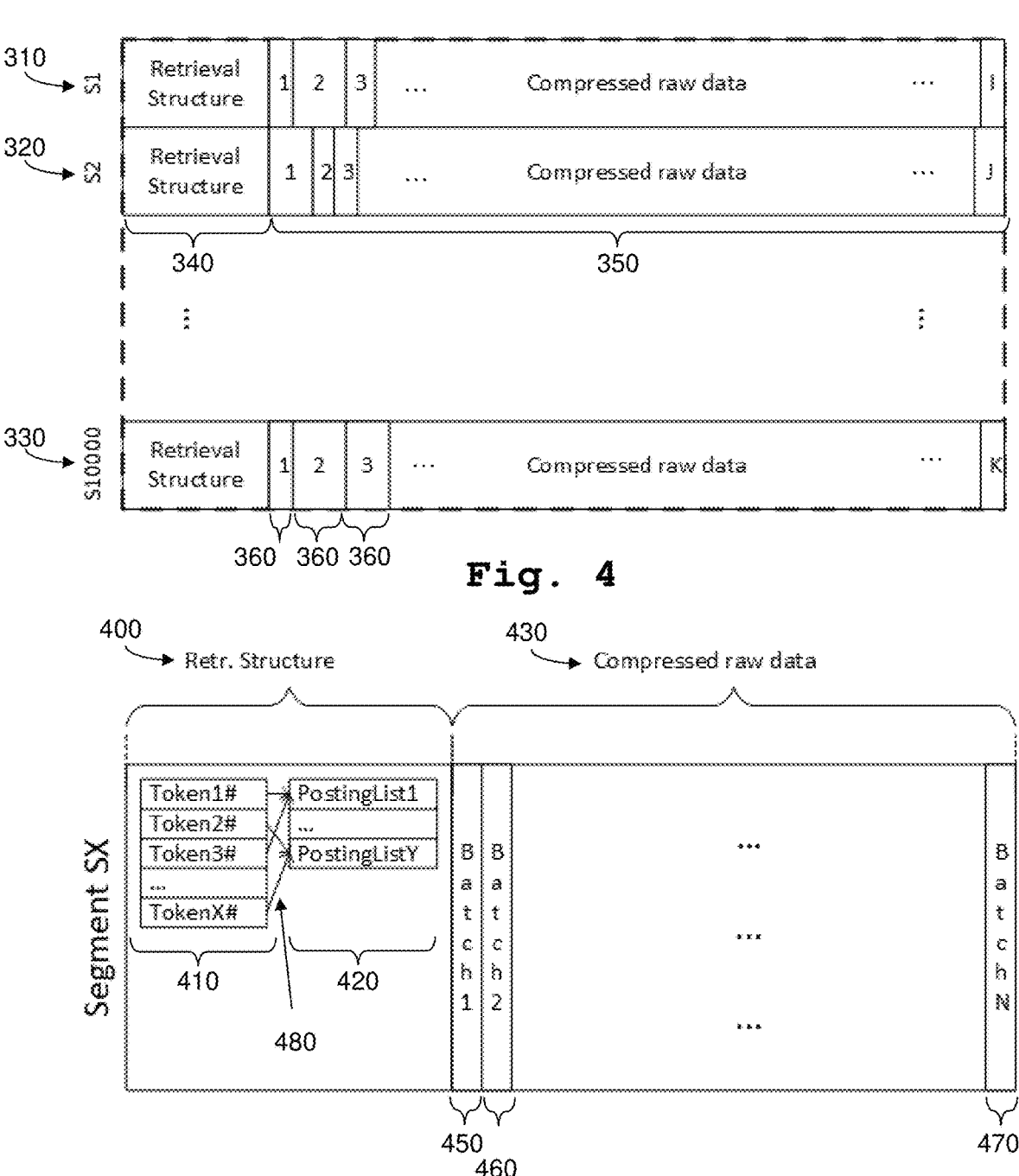
Figure 5:
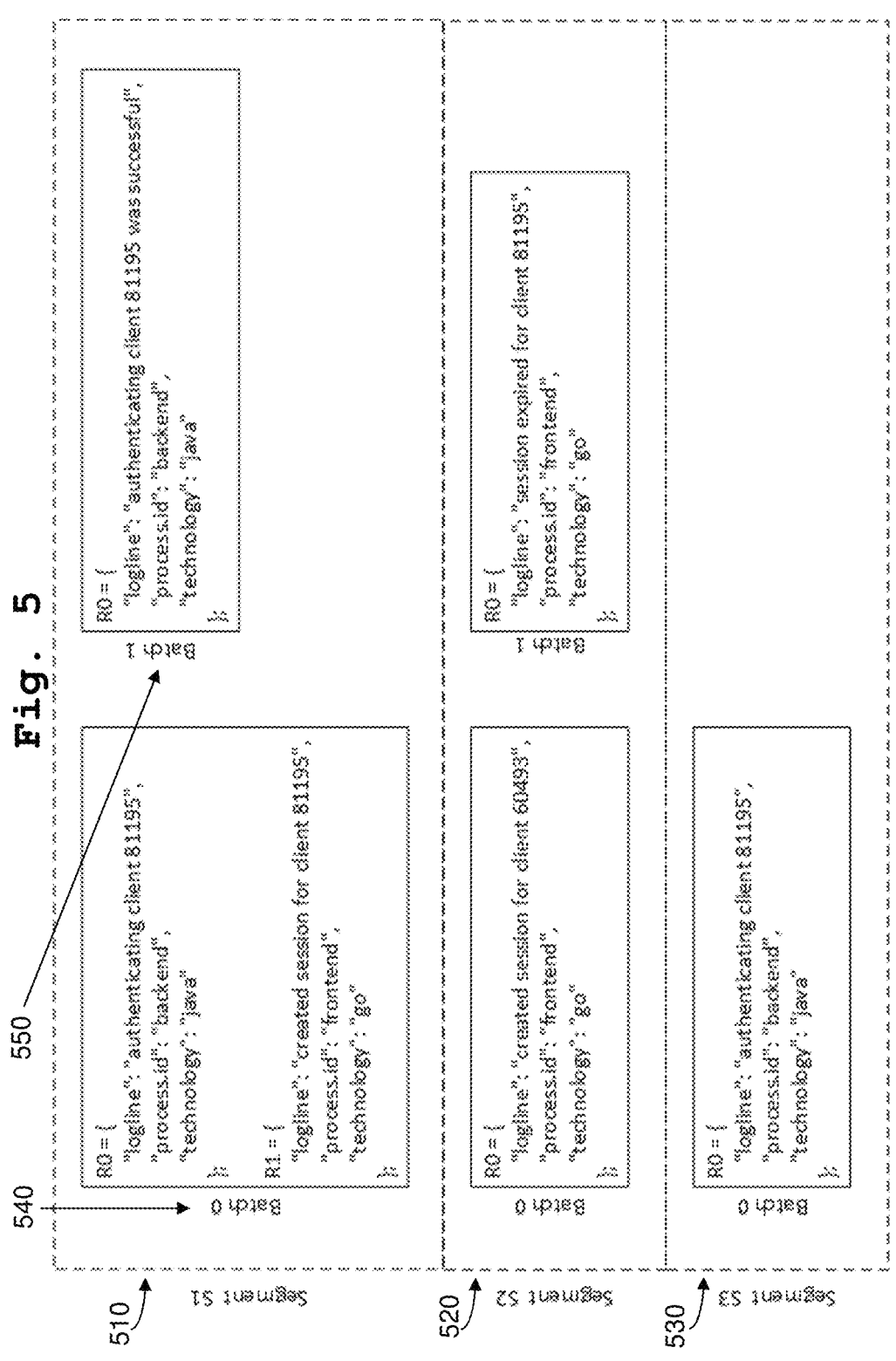
Figure 6:
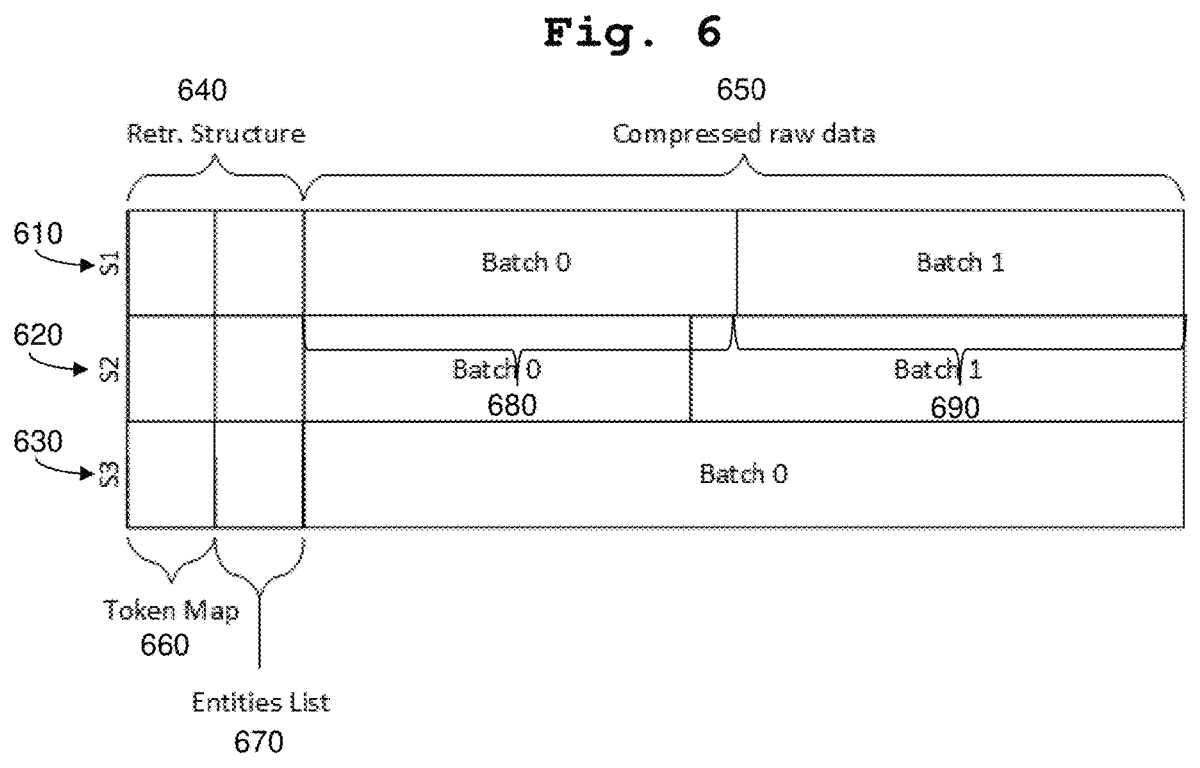
Figure 7:
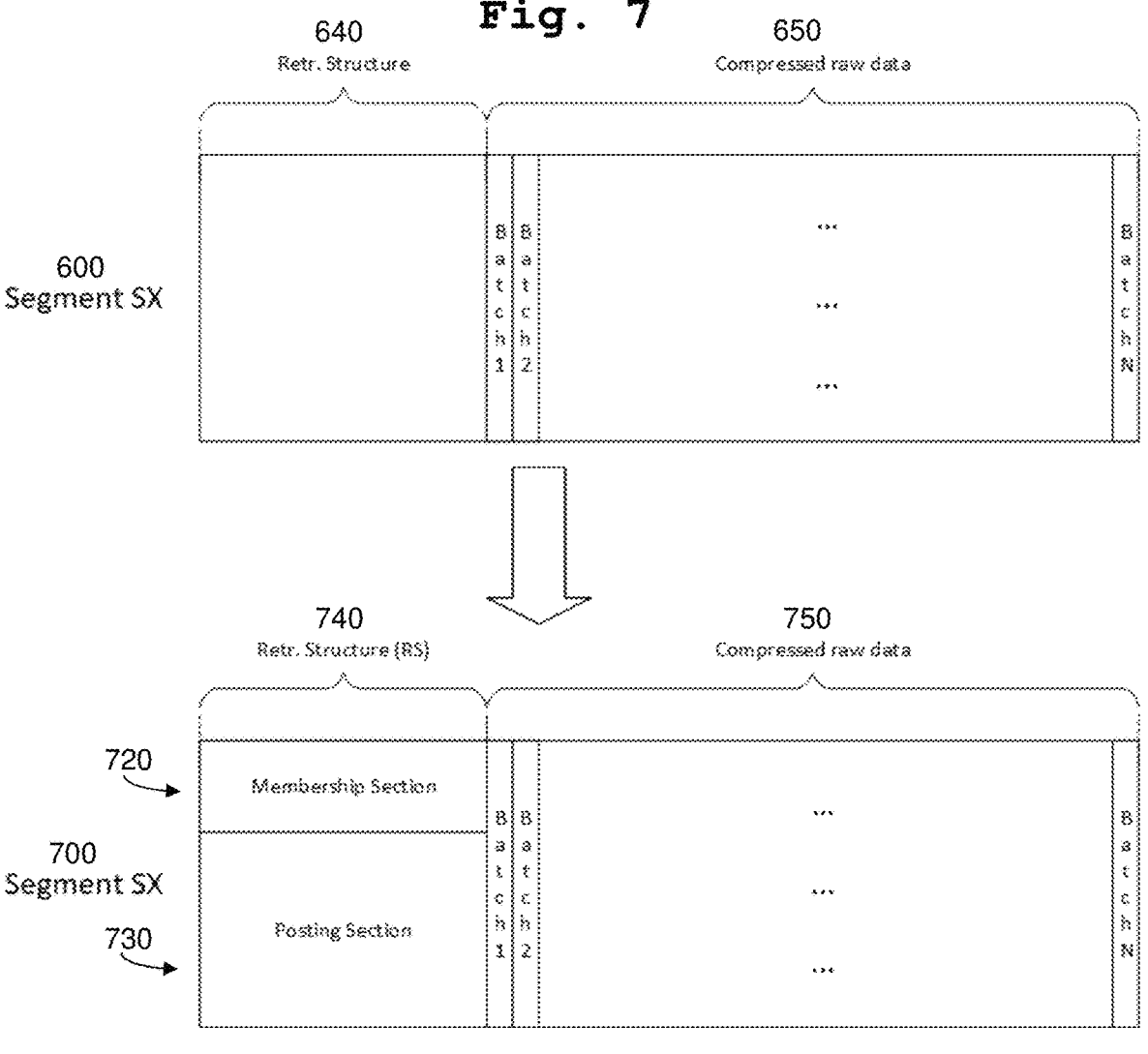
Figure 8:
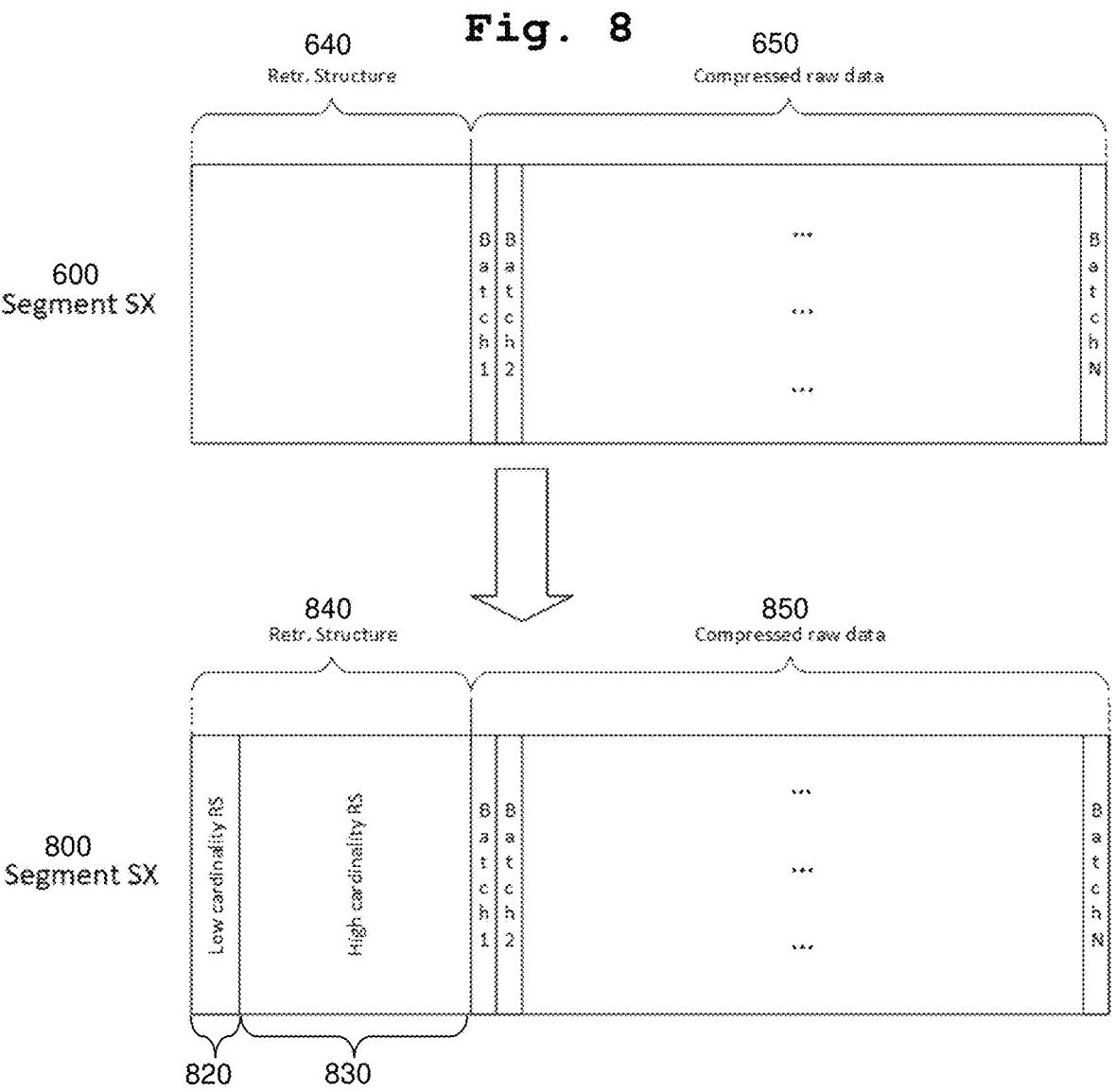
Figure 9:
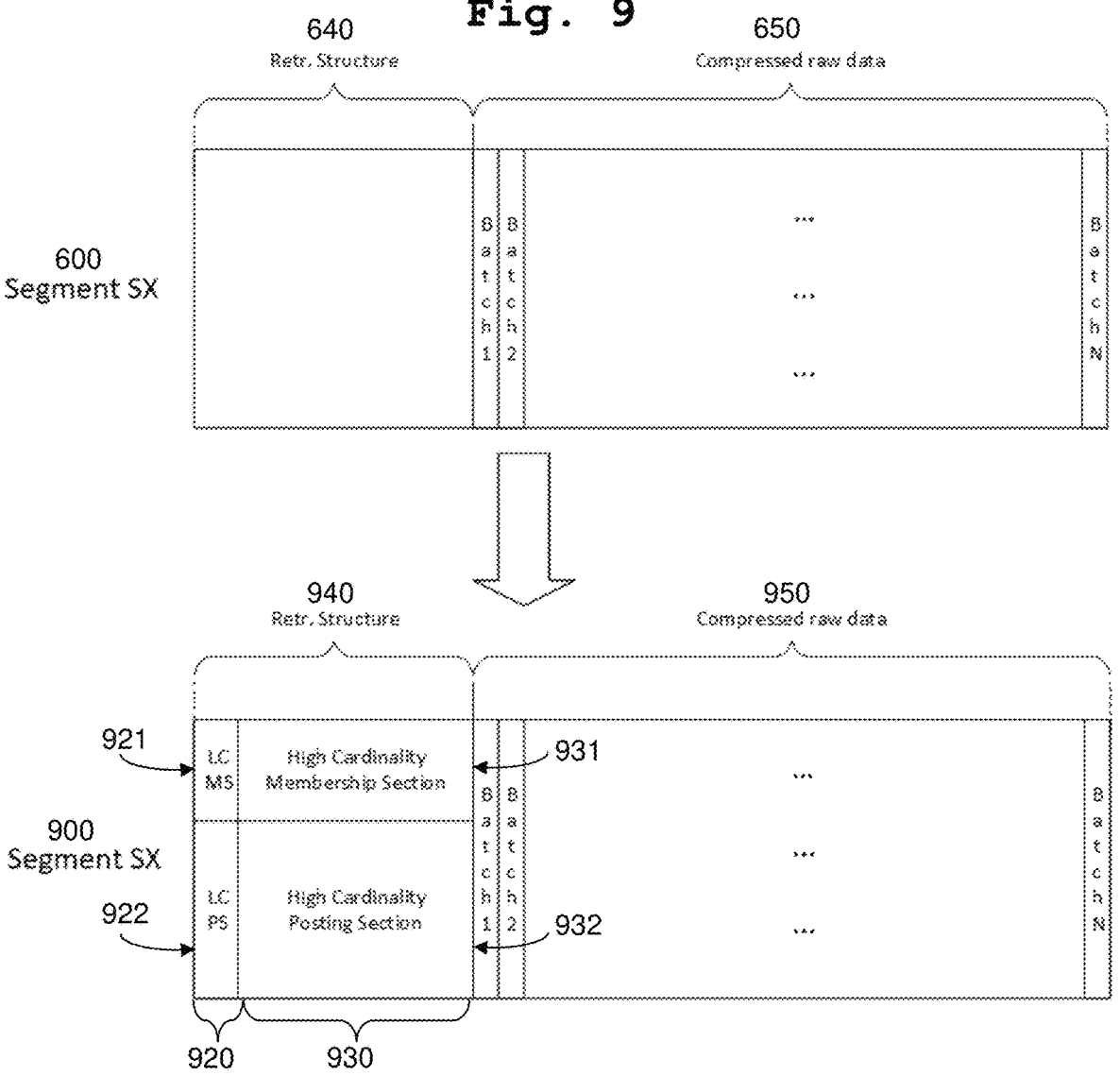

FIG. 1 schematically shows a first variant of a data structure for storing application monitoring and security data according to prior art, FIG. 2 schematically shows another variant of the data structure for storing application monitoring and security data according to prior art, FIG. 3 shows a segmented database for storing and querying of application monitoring and security data, FIG. 4 shows one segment of the segmented database of FIG. 3, FIG. 5 shows records and batches of records to be added to a segmented database, FIG. 6 shows a retrieval structure and a compressed raw data storage for one segment of a segmented database, FIG. 7 shows the data structure of FIG. 6 and a $1^{st}$ variant of the retrieval structure comprising membership and posting sections, FIG. 8 shows the data structure of FIG. 6 and a $2^{nd}$ variant of the retrieval structure comprising low and high cardinality retrieval structures, FIG. 9 shows the data structure of FIG. 6 and a $3^{rd}$ variant of the retrieval structure comprising a low cardinality retrieval structure having membership and posting sections, and a high cardinality retrieval structure having membership and posting sections.

Corresponding reference numerals indicate corresponding parts throughout the several views of the drawings.

DETAILED DESCRIPTION

Example embodiments will now be described more fully with reference to the accompanying drawings.

FIG. 1 shows a prior art solution for storing application monitoring and security data, such as log lines (short logs), traces, spans, metrics etc. The raw data 100 collected from user's applications, hosts, net-works etc. has a size of 1 PB (equivalent to 1,000 TB or 1,000,000 GB). After compressing the raw data 100 in a compression step 110, the compressed data 120 is stored in an object storage, such as AWS S3. Assuming that the compression step has a compression ratio of 20:1, the compressed data has a size of 50 TB. Although object storage services are reliable and inexpensive, downloading 130 of data from the internet takes a long time. Assuming a download speed of 10 GBit/s, downloading the compressed data 120 from the object storage by a single node machine 140 takes some 11 h, which is unacceptable for most use cases.

One prior art solution for the problem of long downloading times is shown in FIG. 2. Also in this case, 1 PB of raw data 100 is compressed to 50 TB in a compression step 110 and the compressed data is stored in an object storage 120 accessible via the internet. Downloading the data from the object storage is done by multiple nodes, in this case 4000 nodes 140-1 . . . 140-4000, in parallel. Assuming the download speed of 10 GBit/s as before, the data can be downloaded in 10 s instead of 11 h as before. Using many nodes in parallel is an attractive but expensive solution.

Another solution for storing and querying large amounts of data is shown in FIG. 3. In this case, data is segmented into multiple segments S1, S2 to S10000, where each segment S1 310, S2 320 . . . . S10000 330 comprises a retrieval structure 340, e.g., an inverted index or a probabilistic data structure, and a section for storing compressed raw data 350. The section for storing compressed raw data 350 is divided into multiple batches 360. Segment S1 contains I batches, segment S2 J batches and segment S3 contains K batches. In response to a database query, the retrieval structures 340 of the segments allow the identification of batches of data in the segments such that only matching batches are downloaded from the internet. The download can take place by one or multiple nodes in parallel.

FIG. 4 schematically shows a mutable, i.e. uncompressed, retrieval structure 400 and the corresponding compressed raw data section 430 for one segment SX according to U.S. Ser. No. 18/119,331 and U.S. Ser. No. 18/383,031. The retrieval structure 400 is a probabilistic data structure, comprising a table Token Map 410 containing a list of hash values (the hash value of the first token Token1 is Token1 # and the hash value of the x-th token is TokenX #) of tokens and a table Entities List 420 containing a list of posting lists, where a posting list essentially is a list unique batch IDs (also called postings). In the examples, matching addresses in the column ADD of the table Token Map and the column ADD of the table Entities List, connect a row in the table Token Map to a single row in the table Entities List. In FIG. 4, the connection between rows in the table Token Map 410 and rows in the table Entities List 420 is shown by arrows 480. A posting list is a list of one or more batch identifiers, where the token is found in the compressed raw data 430. The compressed raw data 430 is split into multiple batches (batch 1 450, batch 2 460 to batch N 470). The batches typically are of different size. It is understood that the number of token hashes X, the number of unique posting lists Y and the number of batches N is variable as it depends on the data comprised in the segment.

In a first application example, records of application monitoring, observability and security data are added to a database. Each record consists of one or multiple key-value pairs, called fields. Field keys are identifiers of some property, while field values represent the concrete expressions of the property. E.g., a record might be used to add log data from an application together with some additional context information to the database system.

Tab. 1 shows an example record containing three fields, field 1 for the collected log line, field 2 for the process producing the log line and field 3 for the technology of the process.

TABLE 1

| Example record for log data | | |
| --- | --- | --- |
| | Key | Value |
| Field 1 | "logline" | "authenticating client with clientId 81195" |
| Field 2 | "process.id" | "backend" |
| Field 3 | "technology" | "java" |

The database collects ingested records in one or multiple physical groups, referred to as segments. Each record is contained in one segment, i.e., all fields of a record are stored in the same segment. Segments internally organize individual records into one or multiple batches. Batches typically contain records with a total size of a few hundred kilobytes but can also consist of a single record. Segments typically contain records with a total size of a few gigabytes but can also consist of a single record. By compressing the mutable segment, segments become immutable. In this case, no records can be added to the immutable segment anymore. The choice when segments become immutable can be made dynamically and can, for example, depend on the number of records added, or the total size of the records. After a segment becomes immutable, typically, a new segment is created and ingested records are added to the new segment.

Database segments, in particular immutable segments, are primarily stored in object storage services like AWS S3 (Amazon Simple Storage Service). The local drives of the database server act as caches to keep the most relevant data accessible without requiring network access. Data is, for example, relevant if it has been ingested recently or is accessed frequently. In case a segment needs to be accessed that is not available on a local drive, the segment is typically downloaded over a network connection from the object storage service.

As shown in FIGS. 3 and 4, both mutable and immutable segments contain data structures (also referred to as retrieval structures) in order to allow the identification of batches of data containing at least one record fulfilling certain criteria without requiring access to the batches themselves. E.g., a criteria could be that at least one record in a batch has a field "technology" with a value "java". Such data structures can, for example, be traditional inverted indices or compact probabilistic data structures. U.S. Ser. No. 18/119,331 describes one very preferred compact probabilistic data structure, how data is added to the data structure and querying the data structure. Techniques for deriving tokens, de-duplicating tokens, and advanced querying techniques are described in U.S. Ser. No. 18/383,031 for the compact probabilistic data structure. The full contents of U.S. Ser. No. 18/119,331 and U.S. Ser. No. 18/383,031 is incorporated by reference into this application.

The following paragraphs describe how records comprising multiple fields are added to the compact probabilistic data structure of U.S. Ser. No. 18/119,331.

How fields are added to the retrieval structures is determined by the field processing strategy. We will briefly explain three different field processing strategies below:

In a first strategy, tokens for field values of all fields and all records in a segment are added to the retrieval structure. For the record in Tab. 1, only tokens for the field values "authenticating client with clientId 81195", "backend" and "java" are added to the retrieval structure. Therefore, the retrieval structure cannot distinguish between field keys from which the values originated. Consequently, a query can only determine in which batches a value appeared. For example, the query «"technology" EQUALS "java"» can only determine batches in which the value "java" appeared. However, it cannot determine whether the value "java" appeared together with the key "technology" or a different key. This can lead to false-positive matches, where batches are wrongly determined to contain the query criteria.

In the second strategy, tokens for field values and field keys of all fields and all records in a segment are added to the retrieval structure. For the record in Tab. 1, tokens for the field values "authenticating client with clientId 81195", "backend" and "java" are added to the retrieval structure, as well as the field keys "logline", "process.id" and "technology". With this strategy, the query «"technology" EQUALS "java"» can determine which batches contain the key "technology" and the value "java". In this case, the value "java" can still appear with a different key in the data. However, in contrast to the first strategy, this strategy can rule out batches which do not contain the key "technology".

In the third strategy, tokens for field values, field keys and key-value pairs for at least some fields are added to the retrieval structure. For the record in Tab. 1, e.g., tokens for the field values "authenticating client with clientId 81195", "backend" and "java", the field keys "logline", "process.id" and "technology", as well as key-value pairs for "process.id": "backend" and "technology": "java" are added to the retrieval structure. Which fields are added as key-value pairs can be configured. In this example, tokens for the value for the key "logline" are not added as key-value pairs. With this strategy, the query «"technology" EQUALS "java"» can determine which batches contain the key-value pair "technology": "java", ensuring that the queried key and value appeared as a single field within a batch.

Each field processing strategy offers a different compromise between the size of the retrieval structure and the selectivity of queries. While the first strategy might lead to a higher number of false-positive matches, it has the lowest retrieval structure size of the three strategies, because less data is added than in case of the second and third strategy. On the other hand, the third strategy might produce fewer false positives for queries but will also lead to the largest size of the retrieval structure. Unless noted otherwise, the following examples will assume the third field processing strategy.

In addition to the field processing strategy, which determines whether to add field keys, field values and key-value pairs to the retrieval structure, a tokenization strategy is applied. The tokenization strategy determines whether and how a field value is split into multiple parts, called tokens, which are then added to the retrieval structure instead of the field value or in addition to the field value. Typically, tokenization is not applied to field keys or key-value pairs. For some fields, the field value might be added to the retrieval structure as is, while the field value for other fields is tokenized.

The following examples assume that the value of the field "logline" is split by whitespace characters, while all other field values are taken as is. For cases where a field value is directly used as the single token added to the retrieval structure, we will use the terms token and field value interchangeably.

The records to be added to the database system are given in Tab. 2 and FIG. 5. Segment S1 510 of the database shall comprise two batches, of which batch 0 540 comprises two records R0 and R1 and batch 1 550 comprises one record R0. Segment S2 520 of the database shall comprise two batches comprising one record R0 each. Finally, segment S3 530 of the database comprises one batch having one record R0.

TABLE 2

Records added to the retrieval structures

| Segment | Batch | Record | Field | Key | Value |
|---------|-------|--------|-------|-----|-------|
| S1 | 0 | R0 | 1 | "logline" | "authenticating client 81195" |
| | | | 2 | "process.id" | "backend" |
| | | | 3 | "technology" | "java" |
| | | R1 | 1 | "logline" | "created session for client 81195" |
| | | | 2 | "process.id" | "frontend" |
| | | | 3 | "technology" | "go" |
| | 1 | R0 | 1 | "logline" | "authenticating client 81195 was successful" |
| | | | 2 | "process.id" | "backend" |
| | | | 3 | "technology" | "java" |
| S2 | 0 | R0 | 1 | "logline" | "created session for client 60493" |
| | | | 2 | "process.id" | "frontend" |
| | | | 3 | "technology" | "go" |
| | 1 | R0 | 1 | "logline" | "session expired for client 81195" |
| | | | 2 | "process.id" | "frontend" |
| | | | 3 | "technology" | "go" |
| S3 | 0 | R0 | 1 | "logline" | "authenticating client 81195" |
| | | | 2 | "process.id" | "backend" |
| | | | 3 | "technology" | "java" |

In FIG. 5, the records to be added to the segments of the database are denoted in JSON format. While the specific format is largely irrelevant, it is important that the same format is used for adding and querying data. As the value of the key "logline" typically comprises multiple "words" and in order to allow querying for words contained in the value/sentence "logline", the value of the key "logline" is split into tokens. According to the examples given below, splitting is done by whitespace characters. The disclosure is not limited to a particular tokenization strategy; U.S. Ser. No. 18/383,031 introduces additional tokenization strategies that are beneficial for many use cases, e.g. querying comprising wildcards.

After splitting the value for the key "logline", adding field keys, and key-value pairs for all keys but "logline", the following tokens/key-value pairs are to be added to the retrieval structures for segments S1-S3:

Segment S1:

| Batch | Record | Token/Key-value pair |
|-------|--------|----------------------|
| 0 | 0 | logline |
| | | authenticating |
| | | client |
| | | 81195 |
| | | process.id |
| | | backend |
| | | "process.id": "backend" |
| | | technology |
| | | java |
| | | "technology": "java" |
| | 1 | logline |
| | | created |
| | | session |
| | | for |
| | | client |
| | | 81195 |
| | | process.id |
| | | frontend |
| | | "process.id": "frontend" |
| | | technology |
| | | go |
| | | "technology": "go" |
| 1 | 0 | logline |
| | | authenticating |
| | | client |
| | | 81195 |

-continued

Segment S1:

| Batch | Record | Token/Key-value pair |
|-------|--------|----------------------|
| | | was |
| | | successful |
| | | process.id |
| | | backend |
| | | "process.id": "backend" |
| | | technology |
| | | java |
| | | "technology": "java" |

Segment S2:

| Batch | Record | Token/Key-value pair |
|---|---|---|
| 0 | 0 | logline |
| | | created |
| | | session |
| | | for |
| | | client |
| | | 60493 |
| | | process.id |
| | | frontend |
| | | "process.id": "frontend" |
| | | technology |
| | | go |
| | | "technology": "go" |
| 1 | 0 | logline |
| | | session |
| | | expired |
| | | for |
| | | client |
| | | 81195 |
| | | process.id |
| | | frontend |
| | | "process.id": "frontend" |
| | | technology |
| | | go |
| | | "technology": "go" |

Segment S3:

| Batch | Record | Token/Key-value pair |
|---|---|---|
| 0 | 0 | logline |
| | | authenticating |
| | | client |
| | | 81195 |
| | | process.id |
| | | backend |
| | | "process.id": "backend" |
| | | technology |
| | | java |
| | | "technology": "java" |

In an additional optional step, duplicate tokens/key-value pairs within the same batch are removed before adding data to the retrieval structure. Doing this, e.g., removes the duplicates "logline", "client", "81195" . . . within segment S1 from the dataset. While adding duplicates does not modify the retrieval structure, it is generally computationally cheaper to remove duplicates than to add them to the retrieval structure.

After deduplication of tokens, omission of the column "Record" and forming a list of batch identifiers, where the token is found, the data to be added to the respective retrieval structures is given in Tab. 3-Tab. 5 below. The meaning of the column Batch is that the token/key-value pair is found in the corresponding batch/batches. E.g., the token "backend" is found in batches 0 and 1, and the token "go" is found in batch 0 only, i.e. it is not contained in batch 1.

TABLE 3

| Tokens/key-value pairs for segment S1 Segment S1: | |
|---|---|
| Batch | Token/Key-value pair |
| 0, 1 | logline |
| 0, 1 | authenticating |
| 0, 1 | client |

TABLE 3-continued

| Tokens/key-value pairs for segment S1 Segment S1: | |
|---|---|
| Batch | Token/Key-value pair |
| 0, 1 | 81195 |
| 0, 1 | process.id |
| 0, 1 | backend |
| 0, 1 | "process.id": "backend" |
| 0, 1 | technology |
| 0, 1 | java |
| 0, 1 | "technology": "java" |
| 0 | created |
| 0 | session |
| 0 | for |
| 0 | frontend |
| 0 | "process.id": "frontend" |
| 0 | go |
| 0 | "technology": "go" |
| 1 | was |
| 1 | successful |

TABLE 4

| Tokens/key-value pairs for segment S2 Segment S2: | |
|---|---|
| Batch | Token/Key-value pair |
| 0, 1 | logline |
| 0, 1 | session |
| 0, 1 | for |
| 0, 1 | client |
| 0, 1 | process.id |
| 0, 1 | frontend |
| 0, 1 | p"rocess.id": "frontend" |
| 0, 1 | technology |
| 0, 1 | go |
| 0, 1 | "technology": "go" |
| 0 | created |
| 0 | 60493 |
| 1 | expired |
| 1 | 81195 |

TABLE 5

| Tokens/key-value pairs for segment S3 Segment S3: | |
|---|---|
| Batch | Token/Key-value pair |
| 0 | logline |
| 0 | authenticating |
| 0 | client |
| 0 | 81195 |
| 0 | process.id |
| 0 | backend |
| 0 | "process.id": "backend" |
| 0 | technology |
| 0 | java |
| 0 | "technology": "java" |

As mentioned above, each segment contains a data structure that can be used to identify batches of records fulfilling a query criteria. We refer to these data structures as retrieval structures. The retrieval structure can, for example, be an inverted index or a probabilistic data structure as in U.S. Ser. No. 18/119,331. While these retrieval structures work differently internally, they all need to encode a mapping between tokens/values appearing in the records and the identifiers of the batches in which these values appear. We will refer to the batch identifiers stored within retrieval structures as posting list. Each encoded pair of a token/value and the corresponding posting list represents one mapping.

U.S. Ser. No. 18/119,331 describes in detail how tokens originating at a computing source having an ID are added to a probabilistic data structure, comprising a table Token Map, a table Entities List and a table Lookup Map. In the following examples, the respective token and the ID of the batch in which the token is comprised in the raw data are added to the probabilistic data structure. Using the procedure described in U.S. Ser. No. 18/119,331 for adding the data of Tab. 3 to Tab. 5 to the database results in the following probabilistic data structures for segments S1 to S3:

Segment S1:

TOKEN MAP

| Token Hash | ADD |
|---|---|
| (logline)# | 1 |
| (authenticating)# | 1 |
| (client)# | 1 |
| (81195)# | 1 |
| (process.id)# | 1 |
| (backend)# | 1 |
| ("process.id": "backend")# | 1 |
| (technology)# | 1 |
| (java)# | 1 |
| ("technology": "java")# | 1 |
| (created)# | 2 |
| (session)# | 2 |
| (for)# | 2 |
| (frontend)# | 2 |
| ("process.id": "frontend")# | 2 |
| (go)# | 2 |
| ("technology": "go")# | 2 |
| (was)# | 3 |
| (successful)# | 3 |

ENTITIES LIST

| ADD | TC | IDS# | IDS |
|---|---|---|---|
| 1 | 10 | (0, 1)# | 0, 1 |
| 2 | 7 | (0)# | 0 |
| 3 | 2 | (1)# | 1 |

TABLE 6

Probabilistic data structure for segment S1
LOOKUP MAP

| IDS# | ADD |
|---|---|
| (0, 1)# | 1 |
| (0)# | 2 |
| (1)# | 3 |

Segment S2:

TOKEN MAP

| Token Hash | ADD |
|---|---|
| (logline)# | 1 |
| (session)# | 1 |
| (for)# | 1 |
| (client)# | 1 |
| (process.id)# | 1 |

-continued

TOKEN MAP

| Token Hash | ADD |
|---|---|
| (frontend)# | 1 |
| ("process.id": "frontend")# | 1 |
| (technology)# | 1 |
| (go)# | 1 |
| ("technology": "go")# | 1 |
| (created)# | 2 |
| (60493)# | 2 |
| (expired)# | 3 |
| (81195)# | 3 |

ENTITIES LIST

| ADD | TC | IDS# | IDS |
|---|---|---|---|
| 1 | 10 | (0, 1)# | 0, 1 |
| 2 | 2 | (0)# | 0 |
| 3 | 2 | (1)# | 1 |

TABLE 7

Probabilistic data structure for segment S2
LOOKUP MAP

| IDS# | ADD |
|---|---|
| (0, 1)# | 1 |
| (0)# | 2 |
| (1)# | 3 |

Segment S3:

TOKEN MAP

| Token Hash | ADD |
|---|---|
| (logline)# | 1 |
| (authenticating)# | 1 |
| (client)# | 1 |
| (81195)# | 1 |
| (process.id)# | 1 |
| (backend)# | 1 |
| ("process.id": "backend")# | 1 |
| (technology)# | 1 |
| (java)# | 1 |
| ("technology": "java")# | 1 |

ENTITIES LIST

| ADD | TC | IDS# | IDS |
|---|---|---|---|
| 1 | 10 | (0)# | 0 |

TABLE 8

Probabilistic data structure for segment S3
LOOKUP MAP

| IDS# | ADD |
|---|---|
| (0)# | 1 |

Note that the above probabilistic data structures have a very low number of "false positives". In Tabs. 6-8 above, no actual hash values are printed, instead hash values was abbreviated by "(X) #", where X is a variable. In other words, e.g., "(logline) #" stands for the hash value of the string "logline", "(0) #" for the hash value of 0 etc.

Note also that for querying the probabilistic data structures, the table "Lookup Map" is no longer required. In addition, the columns "TC" and "IDS #" of the table "Entities List" are not required either. Actually, for each token a mapping from the "Token Hash" in the table "Token Map" to an entry "IDS" containing a list of batches or postings in the table "Entities List" is required. The retrieval structures for segments S1-S3 are given below:

Segment S1:

TOKEN MAP

| Token Hash | ADD |
|---|---|
| (logline)# | 1 |
| (authenticating)# | 1 |
| (client)# | 1 |
| (81195)# | 1 |
| (process.id)# | 1 |
| (backend)# | 1 |
| ("process.id": "backend")# | 1 |
| (technology)# | 1 |
| (java)# | 1 |
| ("technology": "java")# | 1 |
| (created)# | 2 |
| (session)# | 2 |
| (for)# | 2 |
| (frontend)# | 2 |
| ("process.id": "frontend")# | 2 |
| (go)# | 2 |
| ("technology": "go")# | 2 |
| (was)# | 3 |
| (successful)# | 3 |

TABLE 9

Retrieval structure for segment S1
ENTITIES LIST

| ADD | IDS |
|---|---|
| 1 | 0, 1 |
| 2 | 0 |
| 3 | 1 |

Segment S2:

TOKEN MAP

| Token Hash | ADD |
|---|---|
| (logline)# | 1 |
| (session)# | 1 |
| (for)# | 1 |
| (client)# | 1 |
| (process.id)# | 1 |
| (frontend)# | 1 |
| ("process.id": "frontend")# | 1 |
| (technology)# | 1 |
| (go)# | 1 |
| ("technology": "go")# | 1 |
| (created)# | 2 |
| (60493)# | 2 |
| (expired)# | 3 |
| (81195)# | 3 |

TABLE 10

Retrieval structure for segment S2
ENTITIES LIST

| ADD | IDS |
|---|---|
| 1 | 0, 1 |
| 2 | 0 |
| 3 | 1 |

Segment S3:

TOKEN MAP

| Token Hash | ADD |
|---|---|
| (logline)# | 1 |
| (authenticating)# | 1 |
| (client)# | 1 |
| (81195)# | 1 |
| (process.id)# | 1 |
| (backend)# | 1 |
| ("process.id": "backend")# | 1 |
| (technology)# | 1 |
| (java)# | 1 |
| ("technology": "java")# | 1 |

TABLE 11

Retrieval structure for segment S3
ENTITIES LIST

| ADD | IDS |
|---|---|
| 1 | 0 |

Let us give some brief examples for the mapping between token hashes, i.e. hash values of tokens, in the column "Token Hash" of the table "Token Map" and batch identifiers, i.e. IDs of batches, in the column IDS of the table "Entities List" according to the retrieval structure for segment S1 in Tab. 9: Generally, data is added on a batch level, not on a record level. First, let us look at the token «authenticating», which is present in R0 of batch 0 and R0 of batch 1 (see Tab. 2, Tab. 3 and FIG. 5). Hashing the token by a hash function generates a hash value, in the tables abbreviated as "(authenticating) #". Browsing the Token Map for the hash value yields the address 1 in column ADD of the Token Map. The address ADD maps a row in the Token Map to exactly one row in the table Entities List. E.g., the first row of the table Entities List also has the address 1 and contains the batch IDs "0, 1" in column IDS. Thus, records containing the token "authenticating" should be comprised in batches 0 and 1 of segment S1, which is correct. Second, let us look at the token «was». The hash value (was) # for the token "was" refers to the address 3, which corresponds to batch ID "1". Thus, at least one record containing the token "was" should be comprised in batch 1 of segment S1, which is correct too. Finally, let us look at the token «success». The hash value (success) # for the token "success" is not contained in the Token Map. Thus, there should be no record in segment S1 comprising this token. While it is correct that the word/token "success" is not comprised in the retrieval structure, the term "success" is actually contained in the token "successful". However, as only words separated by whitespaces were tokenized (and not n-grams or generally parts of words), the token "success" is not comprised in segment S1.

The structure of the database for segments S1 610, S2 620, S3 630 built in the first application example is schematically shown in FIG. 6. Each segment comprises a retrieval structure 640 and a section for compressed raw data 650. In case of mutable retrieval structures, each retrieval structure 640 comprises a table Token Map 660 and a table Entities List 670. The sections for compressed raw data for segments S1 and S2 comprise two batches each (batches 0 and 1), whereas the compressed raw data section 650 for segment S3 comprises a single batch (batch 0). We use integer numbers as batch identifiers, i.e. 0 and 1.

After having built-up the retrieval structures, three sample queries will be investigated in a second application example. The sample queries are given in Tab. 12 below:

TABLE 12

| Sample queries | |
|---|---|
| Query | Criterion/Criteria |
| Q1 | "technology" EQUALS "java" |
| Q2 | "host" EQUALS "host-1" |
| Q3 | "technology" EQUALS "go" AND "logline" CONTAINS "successful" |

According to a typical case, database segments are delimited by time, e.g., segment S1 covers a certain time period say Oct. 10, 2023, segment S2 covers another time period say October 11, and segment S3 covers yet another time period say Oct. 12, 2023. In this case, segments S1 and S2 as well as S2 and S3 are adjacent to each other, respectively. For querying the segments it is subsequently assumed that all segments might contain relevant data, i.e. that no segment can a priori be excluded.

For query Q1 we assume that the retrieval structures for segments S1-S3 are neither available in the memory nor on disk of the computer executing the query. Instead, it is assumed that the retrieval structures are stored in an object storage available on the internet.

Query Q1: First, the query criteria «"technology" EQUALS "java"» is transformed into the same format used in building the retrieval structure, i.e. «"technology": "java"». Next, a hash value for the query criteria is generated using the same hash function that was used when building the retrieval structure. For brevity, the hash value is denoted as "("technology": "java") #". One example of a hash function is the CRC-32 algorithm, which produces 32-bit hash values irrespective of the length of the input value. E.g., the hash value for "technology": "java" is 0x7b54f50c, and the hash value for 0 is 0xf4dbdf21. For this particular hash function, all hash values have a length of 32 bits. After generating the hash value, it is checked whether the hash value is contained in the column "Token Hash" of the table "Token Map". As the table "Token Map" is part of the retrieval structure, the retrieval structure for the segment to be queried needs to be loaded into the memory of the computer executing the query. However, as the retrieval structure is not available on disk, the retrieval structure needs to be downloaded from the internet first.

Querying starts with segment S1. As the retrieval structure is not available in memory nor on disk of the computer querying the database, the retrieval structure for segment 1 is downloaded from a storage service, e.g., AWS S3 storage, and loaded into the memory of the computer. Although the retrieval structure is small compared to the raw data, i.e. the records comprising the log lines and metadata being added to the database above, downloading the retrieval structure significantly slows down querying. Querying the retrieval structure for segment S1 yields that the hash value is present in the table "Token Map" having the address "1". The column "IDS" of the table "Entities List" having the address "1" contains "0, 1" for the IDs of matching batches (also called posting list). Hence it is found that records matching the query criteria for Q1 are found in batches 0 and 1 of segment S1.

As noted above, the probabilistic data structure of U.S. Ser. No. 18/119,331 exhibits a very low rate of false positives. A false positive is given when the retrieval structure reports a record to be present in a batch of a segment, however, the raw data of the batch does not contain a matching record. False positives can occur, e.g., if the hashing function generates identical hash values for distinct tokens. However, the probabilistic data structure of U.S. Ser. No. 18/119,331 does not report any false negatives. A false negative would occur if the retrieval structure reported a record to be absent in a batch of a segment, however, the record is actually contained in the batch's raw data. False positives or rather a low rate of false positives are accepted by design of the probabilistic data structure and do not constitute a design fault. In this case, the advantages of the probabilistic data structure, such as small retrieval structures, fast querying . . . outweigh the disadvantages. As false positives may not be acceptable at all, not just the retrieval structure 600 but also the raw data 650 are stored in the database segments 610, 620, 630. The raw data is typically stored compressed, e.g. in ZIP file format. In order to remove false positives after querying the retrieval structure, the raw data of the batches is loaded and searched, e.g. by using the grep command, for matching records. If no matching record is found in the batch, the batch is removed from the list of matching batch identifiers. In case of query Q1 and segment S1, batches 0 and 1 of segment S1 (see FIGS. 6, 680 and 690) are downloaded from the object storage and after decompressing the raw data, the raw data is searched for the string «"technology": "java"». Doing this confirms that batches 0 and 1 of S1 comprise matching records. Besides the removal of false positives, storing the compressed raw data in the database allows counting and outputting matching records. As the removal of false positives, counting and outputting matching records is known in prior art, these steps are omitted in the subsequent examples.

After having queried segment S1, the next segment S2 is queried. Before S2 can be queried, the retrieval structure is downloaded and loaded into the memory of the computer. Querying segment S2 yields an empty list of matching batch identifiers/postings as the hash value of the query criteria "technology": "java" is not contained in the table Token Map of the segment's retrieval structure.

Next segment S3 is queried. First, the retrieval structure for S3 is downloaded and loaded into the memory of the computer. For segment S3, the hash value is contained in the table "Token Map" and the corresponding list of batches/posting list is "0". Consequently, the batch ID "0" is reported to the query customer. In summary, records matching Q1 were found in batches 0 and 1 of segment S1 and in batch 0 of segment S3.

In some cases, query customers—in particular humans, are not satisfied with getting a list of batch identifiers for the batches where matching records are contained. Typically, humans are interested in seeing matching records and/or at least the number of matching records. As retrieval structures do not contain verbatim copies of records, records need to be extracted from the segment's compressed data storage section. As an example, let us show this for segment S1. As noted above, records matching Q1 were identified in batches 0 and 1 of S1. In order to report matching records to a query customer, the matching batches 0, 1 are loaded from the segment's compressed data storage section before decompressing them. If the compressed data storage section is stored in an object storage such as AWS S3, matching batches are downloaded from the internet before decompression. E.g., if the records were compressed using ZIP or the Lempel-Ziv-Markov chain algorithm (also known as LZMA or LZMA2), matching batches are uncompressed using the corresponding algorithm, e.g., unzip. After uncompressing the batches, records in the batches matching the query are filtered out and passed on to the query customer. Generally, a query customer can be a human or an algorithm for further processing the query result. Filtering records matching Q1 in segment S1 delivers the records R0 from batch 0 and R0 from batch 1. As the application example was kept concise on purpose, both records could be output to the query customer. In case of many matching records, say thousands, either the total number of matching records and/or just some records, e.g., the first 10, could be output to the query customer. It is also possible to limit the filtering of matching records to a maximum number, say 1000 records. Note that filtering and outputting matching records is independent from the retrieval structure used. In other words, this is applicable to split retrieval structures, e.g., by cardinality, by membership and posting sections, or both cardinality and membership and posting sections.

Query Q2: After transforming the query criteria into JSON format, i.e., «"host": "host-1"», hashing the query criteria produces a hash value. Using CRC-32 as hash function, the hash value is 0xab574f62, abbreviated as ("host": "host-1") #. For Q2 we assume that the retrieval structure for S1 is loaded in the memory of the computer, the retrieval structure for S2 is available on disk of the computer, and the retrieval structure for S3 is located in an object storage. Querying starts with segment S1. As the retrieval structure is available in the memory of the computer, downloading and loading the structure aren't necessary. Querying the token map table for the hash value does not produce any hit. Consequently, no matching record is contained in S1. Querying is continued with segment S2. As the retrieval structure is available on disk, the structure is loaded into the memory of the computer before querying. Querying yields no matching record in S2 either. Querying continues with segment S3. In order to query the retrieval structure, the structure is downloaded from the internet and loaded into the memory of the computer. Querying yields no matching record in segment S3 either. In summary, no record matching Q2 was found in any segment.

Query Q3: It is assumed that the retrieval structures for segments S1-S3 are neither available on disk nor in the memory of the computer executing the query. In a first step, the query criteria «"technology" EQUALS "go" AND "logline" CONTAINS "successful"» are split into univariate criteria, where each univariate criterion depends on a single field only. The combination of univariate criteria by logical operators, such as AND, OR, NOR, NOT, XOR etc., shall be logically equivalent to the original criteria. For Q3 the criteria are split into two univariate criterion Q3a: ="technology" EQUALS "go"
Q3b: ="logline" CONTAINS "successful"
such that the combination of the univariate criteria by the logical operator AND is logically equivalent to Q3, i.e.,
Q3: =Q3a AND Q3b Note that the search operator CONTAINS in subquery Q3b looks for records in which the value of the field "logline" contains the value "successful". As the value of the field "logline" was tokenized as it typically contains a sentence of words and only the field name and tokens were added to the retrieval structure, the condition is met if the tokens "logline" and "successful" are found within the same batch.

Querying starts with segment S1 and the first sub-query Q3a. The query term "technology" EQUALS "go" in JSON format is hashed to generate the hash value «("technology": "go") #». After downloading the retrieval structure from the internet and loading it into the memory, the table Token Map is searched for the hash value. The hash value is present in the table at ADD=2 such that the matching line in the table "Entities List" yields the batch/posting list "0". Thus, it is found that records matching Q3a are present in batch 0 of segment S1. Querying is continued with Q3b. As the query term "logline" CONTAINS "successful" refers to the field "logline" and only the field name and the values of this field were added to the retrieval structure, it is checked whether the retrieval structure contains i) the hash value for "logline", and ii) the hash value for "successful". Hashing "logline" and looking it up in the table "Token Map" yields ADD=1, which refers to batches "0, 1". Hashing "successful" and looking it up in the table "Token Map" yields ADD=3, which refers to batch "1". As both terms need to be present within the same batch, the intersection between the sets "0, 1" and "1" is computed, which is "1". Thus, it is found that records matching Q3a are found in batch 0, and that records matching Q3b are found in batch 1 of segment 0. As Q3 combines the univariate criteria Q3a and Q3b by the logical operator AND, the intersection between the sets "0" and "1" is computed which is an empty set. In summary, no record matching Q3 was identified in segment 0.

Querying continues with segment S2 by downloading the retrieval structure from the internet and loading it into the memory. With respect to the subquery Q3a, matches for the hash value of "technology": "go" are found in batches "0, 1". For the subquery Q3b, the hash value of "logline" is found in the same batches. However, the hash value of "successful" is not found in the table "Token Map" such that no batch was identified containing records matching Q3.

Next, segment S3 is queried by downloading the retrieval structure from the internet and loading it into the memory. As the hash value for "technology": "go" is not contained in the table "Token Map", it is not necessary to execute the subquery Q3b as Q3 combines the subqueries Q3a and Q3b by the AND operator. Consequently, it is found that no batch in segment S3 contains matching records. In summary, no records matching Q3 were found in any segment of the database.

As no segments could be excluded a priori, i.e. all segments were considered to be potentially relevant, the retrieval structures of all segments had to be loaded in the second application example. Although the retrieval structure is much smaller than the compressed data (the retrieval structure for logs has a size of some 20% of the compressed data), downloading and loading the retrieval structures slows down querying, particularly for many segments.

Tab. 13 shows the results for the second application example:

TABLE 13

| | | Retrieval Structure | |
|---|---|---|---|
| Query | Segment | Required | Downloaded |
| Q1 | S1 | x | x |
| | S2 | x | x |
| | S3 | x | x |
| Q2 | S1 | x | -(in memory) |
| | S2 | x | -(on disk) |
| | S3 | x | x |
| Q3 | S1 | x | x |
| | S2 | x | x |
| | S3 | x | x |

Results of 2<sup>nd</sup> application example

In order to speed up querying further and reduce the amount of data downloaded from an object storage, it is proposed to split the retrieval structure into two parts, namely a Membership section and a Posting section. By doing so, the posting section is loaded only if the membership section indicates at least one hit. In other words, if the membership section does not contain a single hit, the posting section is not required/loaded at all.

The change in retrieval structures between the second and the third application examples is schematically shown in FIG. 7. Whereas according to the second application example a single retrieval structure 640 exists for each segment (the figure shows a fictive segment SX 600), the retrieval structure 740 for segment SX 700 according to the third application example is split into a Membership Section 720 and a Posting Section 730. The raw data storage section 650, 750 remains unchanged.

The querying of the retrieval structure split into a membership section and a posting section is shown in a third application example. In this example, the retrieval structures of Tab. 9-Tab. 11 and the sample queries of Tab. 12 are reused. In the retrieval structures, the table "Token Map" constitutes the membership section and the table "Entities List" constitutes the Posting section.

For segments S1-S3, the following availability of the membership and posting sections is assumed. Furthermore, it is assumed that all segments need to be queried, i.e. no segment can a priori be excluded.

TABLE 14

Availability of sections for segments S1-S3

| Segment | Section | Availability |
|---|---|---|
| S1 | Membership | no |
| | Posting | no |
| S2 | Membership | yes |
| | Posting | no |
| S3 | Membership | yes |
| | Posting | yes |

For the split retrieval structures, subsequently a simple strategy will be disclosed how to query the segments. While the membership section encodes whether some token is included in the retrieval structure at all, the posting section encodes the postings associated with each token.

Tab. 15 defines the query sequence for this multi-step query execution process. The sequence number defines the execution order of the individual steps in the multi-step query process. The query type determines which sections of the retrieval structures are accessed at a specific query step. "Membership" refers to a query which accesses the membership section of the retrieval structure. "Full" refers to a query which accesses both sections of the retrieval structure. This is closely related to the required sections, which determine which sections of the need to be locally available in order to execute the query step.

TABLE 15

Sequence for querying membership and posting sections of retrieval structures

| Sequence Number | Query Type | Required sections |
|---|---|---|
| 1 | Membership | Membership |
| 2 | Full | Membership, Posting |

| Query Q1: | |
|---|---|
| Query | Criterion/Criteria |
| Q1 | "technology" EQUALS "java" |

Segment S1: Query evaluation starts with segment S1. First, the steps in the query sequence are iterated from the highest to the lowest sequence number, until we find a query step at which all required sections are locally available, or we reach the step having the lowest sequence number. In this case, the step with sequence number 2 (abbreviated from now on as step 2) requires the membership and posting sections, but none of them is locally available. Thus, the next lower step (step 1) is executed. In order to execute step 1, the membership section is required. According to Tab. 14, the membership section is not available. However, as step 1 is the lowest step, it is nevertheless the starting point for query execution.

The execution of step 1 starts by downloading the required section, i.e. the membership section, of the retrieval structure from the object storage service to make it available locally. Next, a membership query is executed to check for the presence of the hash value for "technology": "java" within the membership section, i.e. the table Token Map. Since the membership section of the retrieval structure of segment S1 contains a matching entry for the hash value ("technology": "java") # pointing to ADD=1, the segment—disregarding false positives—contains at least one batch with records matching the query.

Since step 1 of the query execution matched the query, we need to execute the next higher step. Step 2 requires the membership and posting sections. As the membership section is already available, only the posting section is downloaded from the object storage service. In step 2, the posting section, i.e. the table Entities List, of the retrieval structure is accessed and the ID of batches "0, 1" in column "IDS" are read out. In summary, the retrieval structure contains postings 0 and 1 for the query token "technology": "java". As noted above, further query execution steps are omitted in this disclosure.

Segment S2: Next, the query needs to be evaluated for segment S2. Again, the steps in the query sequence are iterated from highest to lowest sequence number, until we find a query step for which all required sections are locally available, or we reach the step with the lowest sequence number. Step 2 requires the membership and posting sections, but only the membership section is locally available. Thus step 2 cannot be executed in the current stage of processing. As the next lower step, step 1, has the lowest sequence number, this is the start point for the query execution.

Since the membership section is already locally available, a membership query is executed to check for the presence of the hash value for the queried token "technology": "java" within the membership section. Since the membership section of the retrieval structure of segment S2 does not contain a matching entry for the hash value, the segment cannot contain any batches with records matching the query. Therefore, query execution for this segment is stopped. In other words, segment S2 does not contain records matching the query Q2.

Segment S3: Finally, the query is evaluated for segment S3. Again, the steps in the query sequence are iterated from highest to lowest sequence number, until we find a query step for which all required sections are locally available, or we reach the step with the lowest sequence number. Both the membership and posting sections are available for step 2, making it the starting point for the query execution. Since both sections are already available locally, no download is necessary. Thus, a full query is executed to identify batches with records matching the query criteria. As a result, it is found that batch 0 contains at least one record matching Q1.

| Query Q2: | |
|---|---|
| Query | Criterion/Criteria |
| Q2 | "host" EQUALS "host-1" |

Segment S1: The query starts with segment S1. According to Tab. 14, neither the membership section nor the posting section is available. In a first step, the step having the highest sequence number, i.e. step 2, is executed. However, as neither the membership nor the posting sections are available, the next lower step, i.e. step 1, is executed. As step 1 is the lowest step, the membership section of segment S1 is downloaded. As the hash value for "host": "host-1" is not present in the membership section of the segment, query execution is stopped.

Segment S2: Querying is continued with segment S2. According to Tab. 14, the membership section is available for section S2, however, the posting section is not. In a first step, the highest step, i.e. step 2, is executed. However, as the posting section is not available, the next lower step, step 1, is executed. In step 1, the membership section is queried whether it contains the hash value for "host": "host-1". As the hash value is not present in the membership section, query execution is stopped.

Segment S3: Querying is continued with segment S3. According to Tab. 14, both the membership and posting sections are locally available. In a first step, the step having the highest sequence number, i.e. step 2, is executed. In step 2, a full query returns an empty list of batch IDs. In summary, query Q2 does not yield any batches in any segment.

| Query Q3: | |
|---|---|
| Query | Criterion/Criteria |
| Q3 | "technology" EQUALS "go" AND "logline" CONTAINS "successful" |

As described above, first the query criteria «"technology": "go" AND "logline" CONTAINS "successful"» are split into a set of univariate criteria, where each univariate criterion depends on one field only, and a set of logical operators, such as AND, OR, NOR, NOT, XOR etc. For Q3 the criteria can be split into two univariate criteria, namely Q3a:="technology" EQUALS "go"
Q3b:="logline" CONTAINS "successful"

and the logical operator AND, such that

Q3: =Q3a AND Q3b

Segment S1: Querying starts with the first database segment S1, the first sub-query Q3a, and sequence number 2 (step 2) according to Tab. 15. As neither the membership nor the posting sections are available, step 2 cannot be executed. Thus, query execution is continued with step 1. However, step 1 cannot yet be executed either. Since step 1 is the lowest step, the membership section of the retrieval structure is downloaded from the internet and loaded into the memory of the computer executing the query. For Q3a, the query term "technology" EQUALS "go" is brought into JSON format, which is "technology": "go", and hashed to generate a hash value. For brevity, the hash value is denoted as ("technology": "go") #. Querying the membership section, i.e. the table "Token Map", of the retrieval structure for the hash value yields that the hash value is present at ADD=2. For Q3b, the query term "logline" CONTAINS "successful" refers to the field "logline". As only the field name and values of this field were added to the retrieval structure, it is checked whether the membership section contains i) a hash value for "logline" and ii) a hash value for "successful". Performing a membership query yields that both hashes are contained in the membership section of the retrieval structure. At step 1, it is open which batch/batches contain records matching Q3.

Querying is continued with step 2 and downloading the posting section of the retrieval structure. For Q3a, the posting section for ADD=2 contains the batch ID 0 (see table Entities List). For Q3b, the membership section for "logline" referred to ADD=1, which corresponds to the batch IDs 0 and 1 in the entities list. The membership section for "successful" referred to ADD=3, which corresponds to batch ID 1 in the table entities list. Since the criteria for subquery Q3b comprises both "logline" and "successful", the intersection between the sets "0, 1" and "1" is computed, which is "1". Thus, records matching Q3b are contained in batch 1. On the other hand, records matching Q3a are contained in batch 0. As in Q3 the AND operator combines the results from Q3a and Q3b, the intersection between the hits from both subqueries constitutes the result for query Q3. Since the intersection between "0" and "1" is an empty, no record matching Q3 was identified in segment S1.

Querying continues with segment S2. Step 2 cannot be executed as the posting section is not available. Thus, the next lower step is executed, which is step 1. Step 1 can be executed since the membership section is already locally available. With respect to subquery Q3a, matches for the hash value of "technology": "go" are found referring to ADD=1. For subquery Q3b, the hash value of "logline" is also found at ADD=1. However, the hash value of "successful" is not found in the membership section. Consequently, querying is stopped and no record matching Q3 was found in segment S2.

After querying S2, segment S3 is queried. Querying starts with step 2. As both the membership and the posting sections are locally available, no download is necessary. With respect to Q3a, it is found that the hash value for "technology": "go" is not contained in the membership section, i.e. the table "Token Map". Thus, it is not necessary to execute the subquery Q3b as the subqueries Q3a and Q3b are connected by the AND operator. Consequently, it is found that no batch in segment S3 contains matching records. In summary, it is found that no records matching Q3 were identified in any segments.

Tab. 16 shows the results for the third application example, where in 6 of 9 cases the posting section of the retrieval structure was not required for querying since the membership section already indicated that a token hash is not present in the retrieval structure:

TABLE 16

| Results of 3<sup>rd</sup> application example | | | | | |
|---|---|---|---|---|---|
| | | Retrieval Structure | | | |
| | | Membership section | | Posting section | |
| Query | Segment | Required | Downloaded | Required | Downloaded |
| Q1 | S1 | x | x | x | x |
| | S2 | x | -(available) | — | — |
| | S3 | x | -(available) | x | -(available) |
| Q2 | S1 | x | x | — | — |
| | S2 | x | -(available) | — | — |
| | S3 | x | -(available) | — | -(available) |
| Q3 | S1 | x | x | x | x |
| | S2 | x | -(available) | — | — |
| | S3 | x | -(available) | — | -(available) |

Instead or even in addition to separating the retrieval structure into membership and posting sections, the retrieval structure can be separated according to the cardinality of fields. This aspect of the disclosure is based on the observation that field values, and the tokens produced for field values, follow a highly skewed distribution. This means that we expect to have a very low number of fields with a very high cardinality of values and tokens, while most fields will have a very low cardinality of values and tokens. The cardinality of a field describes the number of unique values or tokens associated with this field within a segment. Based on this observation, we can separate fields into two groups. One group comprises all fields with a low cardinality, and one group comprises all high cardinality fields. While the exact separation threshold can be configurable, we suggest categorizing fields as low cardinality fields if the ratio between their cardinality and the total number of records within a segment is below 0.02. If a segment contains, for example, one million records, we suggest categorizing fields containing less than 20000 unique values as low cardinality fields. All other fields would in turn be categorized as high cardinality fields. Because of this definition, the categorization of fields can differ between segments. We refer to the categorization of fields into low and high cardinality fields within a single segment as the cardinality group definition.

Consider the example record from Tab. 1. The value in field "technology" describes the technology of the process producing the log line. In this case the process was running on the Java virtual machine and, therefore, the field "technology" has the value "java". While other technologies, such as the .NET virtual machine, Go, or Rust, exist, we would not expect more than a few dozen unique values for the technology field within a single segment. The field technology is therefore a low cardinality field. In contrast, the field "logline" contains tokens of the actual log line produced by an application process. While some parts of log lines may be repeated across many records, we would still expect the "logline" field to contain a high number of unique tokens. Hence, the field "logline" is classified as a high cardinality field.

For the records and fields in Tab. 2, an exemplary cardinality group definition is shown in Tab. 17. Note that the mentioned fraction of 0.02 between the field cardinality and the total number of records is not used in this example, as the number of records is low to keep the example concise.

Since all retrieval structures need to encode mappings between tokens and batches in which these tokens appear, the size of the retrieval structures is typically directly dependent on the number of included tokens and mappings. By building separate retrieval structures for low and high cardinality fields, each of these retrieval structures contains fewer tokens and mappings than a single retrieval structure containing low and high cardinality fields. Additionally, the low cardinality retrieval structure will contain significantly less tokens than the high cardinality retrieval structure and typically also less mappings.

Several strategies can be applied to determine the cardinality groups of fields efficiently. Some examples are listed below:

Static definition of cardinality groups: The simplest strategy is a static cardinality group definition based on the field key. In many use-cases, the fields and their expected cardinality group are well known. An example static definition of cardinality groups is shown in Tab. 17:

TABLE 17

| Static definition of cardinality groups | |
|---|---|
| Field | Cardinality Group |
| logline | high |
| process.id | low |
| technology | low |

If records contain field keys that are not included in the static definition, they can either be handled as low or high cardinality fields. This fallback choice can be configurable. Our suggestion is to treat these fields as high cardinality fields. In this case, the cardinality group definition of the affected segment must be extended with an entry for the new field key and the chosen cardinality group.

Definition of cardinality groups according to cardinality estimates: A second strategy to determine the cardinality groups of fields is the usage of data structures approximately solving the count-distinct problem. The count-distinct problem, also known as cardinality estimation problem, is concerned with finding the number of distinct elements in a stream with repeating elements. Solving this problem exactly requires an amount of memory growing linearly with the number of distinct elements. However, sketches, such as HyperLogLog or UltraLogLog, can estimate the number of distinct elements with high accuracy and drastically reduced memory usage. We refer to these data structures as cardinality estimators. A cardinality estimator is created for each unique field key within a given set of records. To achieve this, the fields of all records are processed iteratively. If the cardinality estimator for the field key does not yet exist, it is created. Afterwards, the field value can either be added to the cardinality estimator directly, or it can be tokenized, and the individual tokens of the value can be added to the cardinality estimator. After all fields of all records of a given record set have been processed, the assignment of the cardinality groups is done. For this, the approximate number of unique elements for each field key is calculated by the cardinality estimators. Then, the fraction between the approximate number of unique elements and the total number of records within the record set/segment is calculated for each field key. If this fraction is below a configurable threshold, e.g., 0.02, the field is treated as a low cardinality field. Otherwise, it is a high cardinality field. For this strategy, it is important to consider when to estimate the cardinality of fields and to define the cardinality groups. The cardinality groups must be defined before any field of any record is added to any retrieval structure, because the retrieval structures would have to be reconstructed if the cardinality group of a field changes during the creation of the retrieval structures.

The definition of cardinality groups can be based on a collection of a configurable number of records within a segment, or by collecting a sample of records within a segment (see below for more details).

A) Collect a configurable number of records within a segment: One possibility is to collect a configurable number of records within a segment. We recommend collecting records until their total size corresponds to roughly 64 megabytes of data. Once the configured number of records is available, the definition of cardinality groups is performed based on these records. Afterwards, all collected records, and all records added to the segment after the definition of the cardinality groups, are processed and their fields added to the corresponding retrieval structures. To add a field to the correct retrieval structure, the cardinality group must be looked up from the cardinality group definition based on the field key. Next, the field value is split into one or multiple tokens. For each of these tokens, the mapping between the token and the batch of the record is added to the retrieval structure. We refer to this process of adding the tokens of a field to the correct retrieval structure as routing.

B) Collect a sample of records within a segment: A second possibility is to sample a fraction of all records added to a segment, e.g., 5% of all records. This sample can then be used to perform the definition of the cardinality groups. In contrast to the first possibility, the cardinality groups are defined after all records have been added to a segment and the retrieval structures. The produced cardinality group definition is then used within the next created segment to assign fields to retrieval structures. With this strategy, the first created segment cannot receive a cardinality group definition from a previous segment, since there is none. For the first segment, either a static definition can be used, or all fields within the first segment can be treated as high cardinality fields. Since we expect the set of field keys within segments and the assignment of fields to cardinality groups to change infrequently, the cardinality group definition produced by a segment should be identical to the definition produced by the following segment in most cases.

In both cases, segments might receive records with field keys that are not included within the cardinality group definition. Like for the static definition, we recommend treating these fields as high cardinality fields. The cardinality group definition of the respective segment must be extended with an entry for the new field key and the chosen cardinality group.

Typically, when a segment becomes immutable, the complete cardinality group definition is stored with the data and retrieval structures of the segment, as it needs to be available during query execution.

The change in retrieval structures between the second and the fourth/fifth application examples is schematically shown in FIG. 8. Whereas according to the second application example a single retrieval structure 640 exists for each segment (the figure shows a fictive segment SX 600), the retrieval structure 840 for segment SX 800 according to the fourth and fifth application examples is split into a low cardinality retrieval structure (short RS) 820 and a high cardinality retrieval structure 830. The raw data storage sections 650, 850 remain unchanged.

In a fourth application example, it is shown how high cardinality fields are added to a high cardinality retrieval structure and low cardinality fields to a low cardinality retrieval structure. As in the previous examples, the records of Tab. 2 will be added to the respective retrieval structures. According to the example, the field "logline" will be added to the high cardinality RS and all other fields will be added to the low cardinality RS. Thus, a static mapping of fields to retrieval structures is used. For the field "logline", only values are added to the high cardinality retrieval structure. Before adding the data to the high cardinality retrieval structure, the value of the field "logline" is tokenized by whitespace characters. For the low cardinality retrieval structure, field names, values, and key-value pairs are added to the retrieval structure.

The following tokens/key-value pairs are added to the low or high cardinality retrieval structure, respectively, for segments S1-S3:

Segment S1-Data to be added to high cardinality retrieval structure:

| Batch | Record | Token/Key-value pair |
|---|---|---|
| 0 | 0 | authenticating |
| | | client |
| | | 81195 |
| | 1 | created |
| | | session |
| | | for |
| | | client |
| | | 81195 |
| 1 | 0 | authenticating |
| | | client |
| | | 81195 |
| | | was |
| | | successful |

Segment S1-Data to be added to low cardinality retrieval structure:

| Batch | Record | Token/Key-value pair |
|---|---|---|
| 0 | 0 | process.id |
| | | backend |
| | | 'process.id": "backend" |
| | | technology |
| | | java |
| | | "technology": "java" |
| | 1 | process.id |
| | | frontend |
| | | "process.id": "frontend" |
| | | technology |
| | | go |
| | | "technology": "go" |
| 1 | 0 | process.id |
| | | backend |
| | | "process.id": "backend" |
| | | technology |
| | | java |
| | | "technology": "java" |

Segment S2-Data to be added to high cardinality retrieval structure:

| Batch | Record | Token/Key-value pair |
|---|---|---|
| 0 | 0 | created |
| | | session |
| | | for |
| | | client |
| | | 60493 |
| 1 | 0 | session |
| | | expired |
| | | for |
| | | client |
| | | 81195 |

Segment S2-Data to be added to low cardinality retrieval structure:

| Batch | Record | Token/Key-value pair |
|---|---|---|
| 0 | 0 | process.id |
| | | frontend |
| | | "process.id": "frontend" |
| | | technology |
| | | go |
| | | "technology": "go" |
| 1 | 0 | process.id |
| | | frontend |
| | | process.id": "frontend" |
| | | technology |
| | | go |
| | | "technology": "go" |

Segment S3-Data to be added to high cardinality retrieval structure:

| Batch | Record | Token/Key-value pair |
|---|---|---|
| 0 | 0 | authenticating |
| | | client |
| | | 81195 |

Segment S3-Data to be added to low cardinality retrieval structure:

| Batch | Record | Token/Key-value pair |
|---|---|---|
| 0 | 0 | process.id |
| | | backend |
| | | "process.id": "backend" |
| | | technology |
| | | java |
| | | "technology": "java" |

After de-duplication and omission of the column "Record", the following tokens are added to the respective retrieval structures:

Segment S1-Dataset for high cardinality retrieval structure:

| Batch | Token/Key-value pair |
|---|---|
| 0, 1 | authenticating |
| 0, 1 | client |
| 0, 1 | 81195 |
| 0 | created |
| 0 | session |
| 0 | for |
| 1 | was |
| 1 | successful |

Segment S1-Dataset for low cardinality retrieval structure:

| Batch | Token/Key-value pair |
|---|---|
| 0, 1 | process.id |
| 0, 1 | backend |
| 0, 1 | "process.id": "backend" |
| 0, 1 | technology |
| 0, 1 | java |
| 0, 1 | "technology": "java" |
| 0 | frontend |
| 0 | "process.id": "frontend" |
| 0 | go |
| 0 | "technology": "go" |

Segment S2-Dataset for high cardinality retrieval structure:

| Batch | Token/Key-value pair |
|---|---|
| 0, 1 | session |
| 0, 1 | for |
| 0, 1 | client |
| 0 | created |
| 0 | 60493 |
| 1 | expired |
| 1 | 81195 |

Segment S2-Dataset for low cardinality retrieval structure:

| Batch | Token/Key-value pair |
|---|---|
| 0, 1 | process.id |
| 0, 1 | frontend |
| 0, 1 | "process.id": "frontend" |
| 0, 1 | technology |
| 0, 1 | go |
| 0, 1 | "technology": "go" |

Segment S3-Dataset for high cardinality retrieval structure:

| Batch | Token/Key-value pair |
|---|---|
| 0 | authenticating |
| 0 | client |
| 0 | 81195 |

Segment S3-Dataset for low cardinality retrieval structure:

| Batch | Token/Key-value pair |
|---|---|
| 0 | process.id |
| 0 | backend |
| 0 | "process.id": "backend" |
| 0 | technology |
| 0 | java |
| 0 | "technology": "java" |

After deduplication, token hashes and the IDs of the batch in which the token is comprised in the raw data are added to the respective retrieval structures. Using the procedure described in U.S. Ser. No. 18/119,331 for adding above datasets to the low and high cardinality retrieval structures yields the following retrieval structures. Also in this case, the table "Lookup Map" and the columns "TC" and "IDS #" of the table "Entities List" are disregarded.

Segment S1—High Cardinality Retrieval Structure:

| Segment S1-High cardinality retrieval structure: TOKEN MAP | |
| --- | --- |
| Token Hash | ADD |
| (authenticating)# | 1 |
| (client)# | 1 |
| (81195)# | 1 |
| (created)# | 2 |
| (session)# | 2 |
| (for)# | 2 |
| (was)# | 3 |
| (successful)# | 3 |

TABLE 18

| High cardinality retrieval structure for segment S1 ENTITIES LIST | |
| --- | --- |
| ADD | IDS |
| 1 | 0, 1 |
| 2 | 0 |
| 3 | 1 |

Segment S1—Low Cardinality Retrieval Structure:

| Segment S1-Low cardinality retrieval structure: TOKEN MAP | |
| --- | --- |
| Token Hash | ADD |
| (process.id)# | 1 |
| (backend)# | 1 |
| ("process.id": "backend")# | 1 |
| (technology)# | 1 |
| (java)# | 1 |
| ("technology": "java")# | 1 |
| (frontend)# | 2 |
| ("process.id": "frontend")# | 2 |
| (go)# | 2 |
| ("technology": "go")# | 2 |

TABLE 19

| Low cardinality retrieval structure for segment S1 ENTITIES LIST | |
| --- | --- |
| ADD | IDS |
| 1 | 0, 1 |
| 2 | 0 |

Segment S2—High Cardinality Retrieval Structure:

| Segment S2-High cardinality retrieval structure: TOKEN MAP | |
| --- | --- |
| Token Hash | ADD |
| (session)# | 1 |
| (for)# | 1 |
| (client)# | 1 |
| (created)# | 2 |
| (60493)# | 2 |
| (expired)# | 3 |
| (81195)# | 3 |

TABLE 20

| High cardinality retrieval structure for segment S2 ENTITIES LIST | |
| --- | --- |
| ADD | Batch |
| 1 | 0, 1 |
| 2 | 0 |
| 3 | 1 |

Segment S2—Low Cardinality Retrieval Structure:

| Segment S2-Low cardinality retrieval structure: TOKEN MAP | |
| --- | --- |
| Token Hash | ADD |
| (process.id)# | 1 |
| (frontend)# | 1 |
| ("process.id": "frontend")# | 1 |
| (technology)# | 1 |
| (go)# | 1 |
| ("technology": "go")# | 1 |

TABLE 21

| Low cardinality retrieval structure for segment S2 ENTITIES LIST | |
| --- | --- |
| ADD | Batch |
| 1 | 0, 1 |

Segment S3—High Cardinality Retrieval Structure:

| Segment S3-H cardinality retrieval structure: TOKEN MAP | |
| --- | --- |
| Token Hash | ADD |
| (authenticating)# | 1 |
| (client)# | 1 |
| (81195)# | 1 |

TABLE 22

| High cardinality retrieval structure for segment S3 ENTITIES LIST | |
| --- | --- |
| ADD | Batch |
| 1 | 0 |

Segment S3—Low Cardinality Retrieval Structure:

| TOKEN MAP | |
| --- | --- |
| Token Hash | ADD |
| (process.id)# | 1 |
| (backend)# | 1 |
| ("process.id": "backend")# | 1 |
| (technology)# | 1 |
| (java)# | 1 |
| ("technology": "java")# | 1 |

TABLE 23

| Low cardinality retrieval structure for segment S3 ENTITIES LIST | |
| --- | --- |
| ADD | Batch |
| 1 | 0 |

Querying of segments' low and high cardinality retrieval structures will be shown in a fifth application example. Also in this example it is assumed that no segment can a priori be excluded from the query, i.e. all segments need to be queried. In the example, the following availability of retrieval structures is assumed:

TABLE 24

| Availability of retrieval structures | | |
| --- | --- | --- |
| Segment | Retrieval Structure | Availability |
| S1 | Low cardinality | no |
| | High cardinality | no |
| S2 | Low cardinality | yes |
| | High cardinality | no |
| S3 | Low cardinality | yes |
| | High cardinality | yes |

Querying the low and high cardinality retrieval structures is done in the following sequence:

TABLE 25

| Sequence for querying low and high cardinality retrieval structures | | |
| --- | --- | --- |
| Sequence Number | Cardinality Groups | Required sections |
| 1 | Low | Low cardinality retrieval structure |
| 2 | Low, High | Low and high cardinality retrieval structures |

| Query Q1: | |
| --- | --- |
| Query | Criterion/Criteria |
| Q1 | "technology" EQUALS "java" |

As all segments are potentially relevant, querying starts with segment S1. The query sequence starts with sequence number 2 (step 2). As according to Tab. 24 no retrieval structure is available on the computer executing the query, step 2 cannot be executed. Thus, step 1 is executed. At the very beginning of step 1, the step cannot be executed either since the low cardinality retrieval structure is missing. However, as step 1 is the lowest step, the low cardinality retrieval structure mentioned in Tab. 25, i.e. the tables Token Map and Entities List of Tab. 19, is downloaded from the internet and loaded into memory. As in the fourth application example only the field "logline" was assigned to the high cardinality retrieval structure; thus, the field "technology" in the query is a low cardinality field. Hashing the query criteria in JSON format "technology": "java" yields the Hash value ("technology": "java") #, which is found in the table Token Map at ADD=1. The row for ADD=1 in the Entities List yields the IDs of the batches 0 and 1. As the criteria for Q1 does not contain any other field, querying is stopped without executing step 2. Note that only the low cardinality retrieval structure is required for Q1. Thus, records matching Q1 were found in batches 0 and 1 of segment S1.

Querying continues with segment S2. The query sequence starts again with step 2. According to Tab. 24, the low cardinality retrieval structure is locally available, but the high cardinality retrieval structure is not. Consequently, step 2 cannot be executed. Next, step 1 is executed. Contrary to the situation for S1, the low cardinality retrieval structure is available such that the step can be executed without load operations. However, the hash value is not found in the table Token Map. As Q1 does not contain any other criterion, querying is stopped without executing step 2. Thus, no records matching Q1 were found in segment S2.

Querying continues with segment S3. The query sequence starts again with step 2. According to Tab. 24, both the low and high cardinality retrieval structures are locally available. Consequently, step 2 can be executed without any load operations. As the criteria of Q1 comprises low cardinality fields only, the table Token Map of the low cardinality retrieval structures is queried for the Hash value ("technology": "java") #. The address ADD=1 corresponds to batch 0 in the table Entities List. As Q1 does not contain any other criterion, querying is stopped. Thus, records matching Q1 were found in batch 0 of segment S3.

In summary, the query customer is informed that records matching Q1 were found in batches 0 and 1 of segment 1 and in batch 0 of segment 3.

| Query Q2: | |
| --- | --- |
| Query | Criterion/Criteria |
| Q2 | "host" EQUALS "host-1" |

Querying again starts with segment S1. The query sequence starts with sequence number 2 (step 2). As according to Tab. 24 no retrieval structure is locally available, step 2 cannot be executed. Thus, step 1 is executed. At the beginning of step 1, the step cannot be executed either since the low cardinality retrieval structure is missing. However, as step 1 is the lowest step, the low cardinality retrieval structure is downloaded from the internet and loaded into memory. According to the static definition of cardinality groups used for building the retrieval structures, only the field "logline" is mapped to the high cardinality retrieval structure and all other fields are mapped to the low cardinality retrieval structure. Thus, the field "host" in the query is a low cardinality field. Query Q2 searches for records for which the value to the key "host" is "host-1". Hashing the query criteria "host": "host-1" yields the hash value ("host": "host-1") #, which is not found in the table Token Map of the low cardinality retrieval structure. As the criteria for Q1 does not contain any other field, querying is stopped without executing step 2. Thus, no records matching Q1 were found in segment S1.

Querying continues with segment S2. The query sequence starts again with step 2. According to Tab. 24, the low cardinality retrieval structure is locally available, but the high cardinality retrieval structure is not. Consequently, step 2 cannot be executed. Next, step 1 is executed. Contrary to S1, the low cardinality retrieval structure is available such that step 1 can be executed without further load operations. Querying the low cardinality retrieval structure yields that the hash value ("host": "host-1") # is not contained in the table Token Map of the low cardinality retrieval structure.

As Q2 does not contain any other criterion, querying is stopped without executing step 2. Thus, no records matching Q2 were found in segment S2.

Querying continues with segment S3. The query sequence starts again with step 2. According to Tab. 24, both the low and high cardinality retrieval structures are locally available. Consequently, step 2 can be executed without any load operations. In case the criteria comprise both low and high cardinality fields, low cardinality fields are queried first. As in this case, no high cardinality fields are contained in the criteria of Q2, the table Token Map of the low cardinality retrieval structures is queried for the hash value ("host": "host-1") #. As the hash value is not contained in the table Token Map and Q2 does not contain any other criterion, querying is stopped. Thus, no records matching Q2 were found in segment S3.

In summary, the query customer is informed that no records matching Q2 were found in any segment.

| Query Q3: | |
|---|---|
| Query | Criterion/Criteria |
| Q3 | "technology" EQUALS "go" AND "logline" CONTAINS "successful" |

First, the query criteria are split into a set of univariate criteria and logical operators connecting the univariate criteria such that the original query criteria are logically equivalent to the logical operators connecting the univariate criteria. Splitting Q3 yields:

$$Q3 :=$$

$$\underbrace{\text{"technology" EQUALS "go"}}_{Q3a} \text{ AND } \underbrace{\text{"logline" CONTAINS "successful"}}_{Q3b}$$

$$Q3 := Q3a \text{ AND } Q3b$$

It is noted that as "technology" is a low cardinality field, for Q3a the low cardinality and for Q3b the high cardinality retrieval structures need to be queried.

Segment S1: Querying is started with the first database segment S1 and step 2 according to Tab. 25. As neither the the internet and loaded into the memory of the query computer. For Q3a, the query term "technology": "go" in JSON format is hashed and a corresponding hash value is generated. Querying the low cardinality retrieval structure for the hash value yields ADD=2, which corresponds to batch ID 0. Querying continues with step 2. In order to execute step 2, the high cardinality retrieval structure is downloaded and loaded into memory. For Q3b, the query term «"logline" CONTAINS "successful"»refers to the field "logline". For this field, only tokens of the value were added to the high cardinality retrieval structure. Thus it is checked whether the table Token Map of the high cardinality retrieval structure contains the hash value of "successful". Hashing "successful" and looking it up in the table "Token Map" yields ADD=3, which corresponds to batch ID 1. As the subqueries Q3a and Q3b are connected by the logical operator AND, the intersection between the batches matching Q3a and Q3b is computed. Since the intersection between "0" and "1" is empty, no records matching Q3 were identified in segment 0.

Segment S2: Querying S2 starts with step 2. As the high cardinality retrieval structure is missing, the step cannot be executed. Thus, step 1 is executed. Step 1 can be executed since the low cardinality structure is locally available. After hashing the query term "technology": "go" of Q3a and querying the low cardinality retrieval structure, batch IDs 0 and 1 are returned. Querying is continued with step 2 and the download of the high cardinality retrieval structure. For Q3b, the hash value of "successful" is not found in the high cardinality retrieval structure. Consequently, no records matching Q3 were found in segment 2.

Segment S3: Querying starts with step 2. As both retrieval structures are locally available, no additional download is necessary. With respect to Q3a, it is found that the hash value for "technology": "go" is not contained in the table "Token Map" of the low cardinality retrieval structure. Thus, it is not necessary to execute the subquery Q3b as the subqueries Q3a and Q3b are connected by the AND operator. Consequently, no records matching Q3 were found in segment S3. In summary, the query customer is informed that no records matching Q3 were found in the database.

Tab. 26 shows the results for the fifth application example:

TABLE 26

| | | Results of 5<sup>th</sup> application example | | | |
|---|---|---|---|---|---|
| | | Retrieval Structures | | | |
| | | Low cardinality | | High cardinality | |
| Query | Segment | Required | Downloaded | Required | Downloaded |
| Q1 | S1 | X | X | — | — |
| | S2 | X | — (available) | — | — |
| | S3 | X | — (available) | — | — (available) |
| Q2 | S1 | X | X | — | — |
| | S2 | X | — (available) | — | — |
| | S3 | X | — (available) | — | — (available) |
| Q3 | S1 | X | X | X | X |
| | S2 | X | — (available) | X | X |
| | S3 | X | — (available) | — | — (available) | low nor high cardinality retrieval structures are available, query execution is continued with step 1. Step 1 cannot yet be executed either, however, since step 1 is the lowest step, the low cardinality retrieval structure is downloaded from It is noted that two out of 3 queries do not require the high cardinality retrieval structure at all, such that querying covering many segments can be done quicker. In addition, the sizes of the low and high cardinality retrieval structures are vastly different. E.g., for log data it is found that only some 4% of tokens and some 13% of batch IDs are contained in the low cardinality retrieval structure. Consequently, the low cardinality structure is much smaller than the high cardinality retrieval structure.

In order to reduce time for querying further and the reduce the amount of data downloaded from storage, it is proposed to split the retrieval structure into four parts, namely a low cardinality retrieval structure and a high cardinality retrieval structure, where both retrieval structures comprise membership and a posting sections. For uncompressed retrieval structures, the table Token map constitutes the membership section, and the table Entities list constitutes the posting section of the respective structure.

The change in retrieval structures between the second and the sixth application example is schematically shown in FIG. 9. Whereas according to the second application example a single retrieval structure 640 exists for each segment (the figure shows a fictive segment SX 600), the retrieval structure 940 for segment SX 900 according to the sixth application example is split into a low cardinality retrieval structure 920 having a low cardinality membership section 921 and a low cardinality posting section 922 and a high cardinality retrieval structure 930 having a high cardinality membership section 931 and a high cardinality posting section 932. The raw data storage sections 650, 950 remain unchanged.

Querying the low and high cardinality retrieval structures, where each retrieval structure is split into membership and posting sections, is shown in a sixth application example. Also in this example it is assumed that no segment can a priori be excluded from the query, i.e. all segments need to be queried. In the example, the following availability of retrieval structures is assumed:

TABLE 27

| Availability of retrieval structures | | | |
| --- | --- | --- | --- |
| Segment | Retrieval Structure | Section | Availability |
| S1 | Low cardinality | Membership | no |
| | | Posting | no |
| | High cardinality | Membership | no |
| | | Posting | no |
| S2 | Low cardinality | Membership | yes |
| | | Posting | no |
| | High cardinality | Membership | no |
| | | Posting | no |
| S3 | Low cardinality | Membership | yes |
| | | Posting | no |
| | High cardinality | Membership | yes |
| | | Posting | no |

Querying the retrieval structures is done in the following sequence:

TABLE 28

| Query sequence | | | |
| --- | --- | --- | --- |
| Sequence Number | Cardinality Groups | Query Type | Required sections |
| 1 | Low | Membership | Low cardinality membership |
| 2 | Low, High | Membership | Low cardinality membership, high cardinality membership |
| 3 | Low, High | Full | Low cardinality membership, low cardinality posting, high cardinality membership, high cardinality posting |

| Query Q1: | |
| --- | --- |
| Query | Criterion/Criteria |
| Q1 | "technology" EQUALS "java" |

As all segments are potentially relevant, querying starts with segment S1: First, the steps in the query sequence are iterated from highest to lowest sequence number, until we find a query step for which all required sections are locally available, or we reach the step with the lowest sequence number. In this case, step 3 requires the membership and posting sections of both retrieval structures, but none is locally available. Step 2 requires the membership sections of both retrieval structures, but none is locally available. Finally, the next lower step, step 1, has the lowest sequence number and is the starting point for query execution. As the field "technology" is a low cardinality field, the membership section, i.e. the table Token Map, of the low cardinality retrieval structure is downloaded from the internet and loaded into the memory of the database server. Note that the query criterion criteria refer to a low cardinality field, thus only the low cardinality retrieval structure is relevant. This is due to the fact that when building the retrieval structures of Tab. 18-Tab. 23 it was assumed that all fields but the field "logline" are contained in the low cardinality retrieval structure. Thus, the field "technology" is contained in the low cardinality retrieval structure too.

The criteria «"technology" EQUALS "java"» is brought into JSON format «"technology": "java"» as this format was used to build up the retrieval structures. Hashing the query term "technology": "java" generates the hash value ("technology": "java") # and looking up the hash value in the membership section yields that the hash value is contained in the structure at ADD=1. Querying is continued with step 2. As Q1 does not contain any high cardinality fields, downloading the high cardinality membership structure is omitted. Next, step 3 is executed. As Q1 does not contain any high cardinality fields, downloading the high cardinality posting section is omitted and only the low cardinality posting section is loaded. Querying the table Entities List for ADD=1 yields the batch IDs 0 and 1.

Segment S2: As steps 3 and 2 cannot be executed, step 1 is the starting point for query execution. Different to S1, the membership section of the low cardinality retrieval structure is already locally available on the database server. Looking up the hash value ("technology": "java") # in the low cardinality membership section yields that it is not contained in the membership section. As Q1 does not contain any high cardinality fields, querying is stopped. Consequently, no matching records were found in section S2.

Segment S3: As step 3 cannot be executed, step 2 is the starting point for query execution as both the low and high cardinality membership sections are available. Looking up the hash value ("technology": "java") # in the low cardinality membership section yields that it is contained in the section at ADD=1. Querying is continued with step 3. As Q1 does not contain any high cardinality fields, downloading the high cardinality posting section is omitted and only the low cardinality posting section is loaded. Querying the posting section, i.e. the table Entities List, for ADD=1 yields batch 0.

In summary, the query customer is informed that records matching Q1 were found in batches 0,1 of S1 and in batch 0 of S3.

| Query Q2: | |
| --- | --- |
| Query | Criterion/Criteria |
| Q2 | "host" EQUALS "host-1" |

Querying starts again with segment S1. As steps 3 and 2 cannot be executed for the same reasons as in querying Q1 in S1, step 1 is the starting point for query execution. As noted above, the field "host" is a low cardinality field (according to the static definition of cardinality groups used for building the retrieval structures, only the field "logline" is mapped to the high cardinality retrieval structure and all other fields, i.e. including the field "host", are mapped to the low cardinality retrieval structure). In step 1, the low cardinality membership structure is downloaded from the internet and loaded into memory. The criteria «"host" EQUALS "host-1"» is brought into JSON format «"host": "host-1"» as this format was used to build up the retrieval structures. Query Q2 searches for records for which the value to the key "host" is "host-1". Hashing the query criteria generates the hash value ("host": "host-1") #; querying the low cardinality membership section for the hash value yields that no records matching Q2 were found in segment S1.

Querying continues with segment S2. As steps 3 and 2 cannot be executed, step 1 is the starting point for query execution. As according to Tab. 24 the low cardinality membership section is locally available, this step can be executed without additional load operations. Querying the membership section of the low cardinality retrieval structure yields no hit. Consequently, querying is stopped and no matching record was found in segment S2.

Querying continues with segment S3. The query sequence starts again with step 3. Although according to Tab. 24 both the low and the high cardinality membership sections are locally available, the step cannot be executed since the posting sections are missing. Thus, step 2 is next. Step 2 can be executed without any load operations. In case the criteria comprise both low and high cardinality fields, low cardinality fields are queried first. As in this case, no high cardinality field is contained in the criteria of Q2, the membership section of the low cardinality retrieval structure is queried for the hash value. As the hash value is not contained in the table Token Map and Q2 does not contain any other criterion, querying is stopped. Thus, no matching record was found in segment S3 either.

In summary, the query customer is informed that no records matching Q2 were found in any database segment.

| Query Q3: | |
| --- | --- |
| Query | Criterion/Criteria |
| Q3 | "technology" EQUALS "go" AND "logline" CONTAINS "successful" |

First, the query is split into a set of univariate subqueries and logical operators such that the original query is logically equivalent to the logical operators connecting the subqueries. Splitting Q3 yields:

$Q3 :=$ $$\underbrace{\text{"technology" EQUALS "go"}}_{Q3a} \text{ AND } \underbrace{\text{"logline" CONTAINS "successful"}}_{Q3b}$$

$Q3 := Q3a \text{ AND } Q3b$

As "technology" is a low cardinality field and "logline" is a high cardinality field, for Q3a the low cardinality and for Q3b the high cardinality retrieval structures need to be queried.

Segment S1: Querying starts with the first database segment S1 and step 3 according to Tab. 28. As no retrieval structure is available, query execution is continued with step 2. Step 2 cannot yet be executed either, as the membership sections of the retrieval structures are missing. Thus, query execution continues with step 1. Since step 1 is the lowest step, the low cardinality membership section is downloaded from the internet and loaded into the memory of the query computer. For Q3a, the query term in JSON format "technology": "go" is hashed and a hash value is generated. Querying the low cardinality membership section for the hash value yields ADD=2. Querying continues with step 2. In order to execute step 2, the high cardinality retrieval membership section is downloaded and loaded into memory. For Q3b, the query term «"logline" CONTAINS "successful"»refers to the field "logline". For this field, only tokens of the value were added to the high cardinality retrieval structure. Thus it is checked whether the membership section of the high cardinality retrieval structure contains the hash value of the token "successful". Hashing "successful" and looking it up in the membership section, i.e. the table "Token Map", yields ADD=3. Querying continues with step 3. In order to execute step 3, the posting sections of the retrieval structures are downloaded and loaded into memory. Querying the low cardinality posting section, i.e. the table Entities List, for ADD=2 yields the batch ID 0. Querying the high cardinality posting section for ADD=3 yields the batch ID 1. As the subqueries Q3a and Q3b are connected by the logical operator AND, the intersection between the batches matching Q3a and Q3b is computed. Since the intersection between "0" and "1" is empty, no records matching Q3 were identified in segment 0. Querying is continued with segment S2.

Segment S2: Querying again starts with step 3. As no posting section is available, query execution is continued with step 2. Step 2 cannot yet be executed either, as the membership section of the high cardinality retrieval structure is missing. Thus, query execution is continued with step 1. Step 1 can be executed since the low cardinality structure is locally available. Thus, no additional download is required. Querying the hash value ("technology": "go") # of Q3a in the low cardinality membership section yields ADD=1. Querying is continued with step 2 and the download of the high cardinality membership section. Querying the hash value ("successful") # of Q3b in the high cardinality membership section yields no hit. As the hash value of "successful" is not found in the high cardinality membership section, querying is stopped. Consequently, no records were found in segment 2. Querying is continued with segment S3.

Segment S3: Querying is again started with step 3. As no posting section is available, query execution is continued with step 2. As both membership sections are locally available, no additional download is necessary. With respect to Q3a, it is found that the hash value for "technology": "go" is not contained in the membership section of the low cardinality retrieval structure. Thus, it is not necessary to execute the subquery Q3b as the subqueries Q3a and Q3b are connected by the AND operator.

In summary, no record matching Q3 was found in any segment.

Tab. 29 summarizes the results for the sixth application example:

TABLE 29

Results of 6$^{th}$ application example

| | | Retrieval Structures | | | |
| | | Low cardinality | | High cardinality | |
| Query | Segment | Membership Required | Posting Required | Membership Required | Posting Required |
|---|---|---|---|---|---|
| Q1 | S1 | X | X | — | — |
| | S2 | X | — | — | — |
| | S3 | X | X | — | — |
| Q2 | S1 | X | — | — | — |
| | S2 | X | — | — | — |
| | S3 | X | — | — | — |
| Q3 | S1 | X | X | X | X |
| | S2 | X | — | X | — |
| | S3 | X | — | — | — |

The result shows that the low cardinality membership section, the high cardinality membership section, the low cardinality posting section and the high cardinality posting section were needed in 9/9, 2/9, 3/9 and 1/9 of all cases, respectively. Thus, splitting the retrieval structure in low and high cardinality retrieval structures, where each retrieval structure comprises membership and posting sections, significantly reduces the amount of data required for querying and greatly speeds up query execution.

It is noted that the split of retrieval structures according to cardinality is not limited to two retrieval structures. Similar effects can be achieved, e.g., by splitting retrieval structures into low, medium and high cardinality retrieval structures.

In addition it is mentioned that the split of retrieval structures into a Membership section and a Posting section is not limited to the mutable retrieval structure of U.S. Ser. No. 18/119,331. Even after compressing the mutable retrieval structure into an immutable retrieval structure, this segmentation applies and the same effects are achieved as described above.

Finally it is noted that "full" queries as referred to e.g. in Tab. 25 and Tab. 28 can either be executed in one step, i.e. querying both the membership and posting sections within the same step, or e.g., if the membership section was already queried in a lower step, in a later step. Both options shall be covered by the disclosure as they have the same effect.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for storing records from a data segment, comprising:

receiving, by a computer processor, a data segment comprised of a plurality of data records, where each of the data records in the plurality of data records includes one or more key-value pairs, wherein the plurality of data records is organized into one or more batches, where each of the one or more batches is assigned a batch identifier;

defining a data structure having a retrieval section and a data section;

for each of the plurality of data records, tokenizing the key-value pairs in a given data record, thereby creating a list of tokens;

storing the list of tokens in the retrieval section of the data structure, where each entry in the list of tokens includes a given token and a list of batch identifiers for the batches which contain the given token;

compressing data records in each of the one or more batches; and storing the compressed data records for each of the one or more batches in the data section of the data structure.

2. The method of claim 1, further comprising retrieving at least one of the data records from the data section.

3. The method of claim 2, wherein the retrieving comprises:

receiving an input value;

querying the list of tokens for the input value; and outputting a list of batch identifiers corresponding to the token.

4. The method of claim 3, wherein the retrieving further comprises:

loading a batch corresponding to the list of batch identifiers;

uncompressing the batch; and identifying a record containing a token corresponding to the input value thereby retrieving the record.

5. The method of claim 1, wherein tokenizing the key-value pairs includes tokenizing one of (i) a key value, (ii) a field value, or both (i) and (ii).

6. The method of claim 1, wherein the tokenizing the key-value pairs includes de-duplicating the tokens in the list of tokens.

7. The method of claim 1, wherein prior to the storing the list of tokens, for each token in the list of tokens the method further includes applying a hash function to the token, thereby creating a list of hashed tokens.

8. The method of claim 1, wherein the retrieval section includes a first list of tokens having low cardinality and a second list of tokens having high cardinality.

9. The method of claim 8, wherein when a cardinality of a token is determined by at least one of (i) a number of records within the data segment, and (ii) a sample of records from a different data segment.

10. A computer-implemented method for querying records from a data segment, comprising:

receiving, by a computer processor, a value for a query of a data segment comprised of a plurality of data records, where each of the data records in the plurality of data records includes one or more key-value pairs, the plurality of data records is organized into one or more batches and each of the one or more batches is assigned a batch identifier;

loading a first list of tokens from a membership section of a data store;

determining whether the value from the query is present in the first list of tokens;

loading a first list of batch identifiers from a posting section of the data store in response to a determination that the value from the query is present in the first list of tokens;

identifying a first posting list in the first list of batch identifiers from the posting section, where the first posting list are for batches which contain the value from the query;

loading at least one batch identified in the first posting list of batch identifiers from a data section of the data store;

uncompressing the at least one batch;

identifying a record having a token matching the value in the at least one batch; and outputting the record.

11. The method of claim 10, further comprising reporting the identified first posting list of batch identifiers to a user.

12. The method of claim 10, further comprising retrieving another data segment.

13. The method of claim 10, further comprising:

receiving a string as the query;

splitting the string into two or more values; and performing the query for each of the two or more values.

14. The method of claim 10, wherein the key-value pairs includes one of (i) a key value, (ii) a field value, or both (i) and (ii).

15. The method of claim 10, wherein the method further includes applying a hash function to the value, thereby creating a hashed value, and wherein the first list of tokens includes hashed tokens.

16. The method of claim 10, wherein the membership section includes a second list of tokens, and wherein the first list of tokens have low cardinality and the second list of tokens have high cardinality.

17. The method of claim 16, wherein a cardinality of a token is determined by at least one of (i) a number of records within the data segment, and (ii) a sample of records from a different data segment.

18. The method of claim 16, further comprising:

loading the second list of tokens in response to a determination that the value from the query is absent in the first list of tokens;

determining whether the value from the query is present in the second list of tokens;

loading a second list of batch identifiers from the posting section of the data store in response to a determination that the value from the query is present in the second list of tokens;

identifying a second posting list in the second list of batch identifiers from the posting section, where the second posting list are for batches which contain the value from the query;

loading at least one batch identified in the second posting list of batch identifiers from the data section of the data store; loading data from the posting section of the data store, where a second list of batch identifiers is loaded from the posting section of the data store in response to a determination that the value from the query is present in the second list of tokens;

uncompressing the at least one batch;

identifying a record having a token matching the value in the at least one batch; and outputting the record.

19. A computer-implemented method for querying records from a data segment, comprising:

receiving, by a computer processor, a value for a query of a data segment comprised of a plurality of data records, where each of the data records in the plurality of data records includes one or more key-value pairs, the plurality of data records is organized into one or more batches and each of the one or more batches is assigned a batch identifier;

loading a first list of tokens from a low cardinality section of a data store, where tokens in the first list of tokens represent values in data records having low cardinality and each entry in the first list of tokens includes a given token and a list of batch identifiers for the batches which contain the given token;

determining whether the value from the query is present in the first list of tokens;

retrieving a particular list of batch identifiers from the first list of tokens, where the particular list of batch identifiers corresponds to a token matching the value from the query;

retrieving one or more data records from a data section of the data store using the particular list of batch identifiers, where the retrieval of the one or more data records is in response to a determination that the value from the query is present in the first list of tokens; and loading a second list of tokens from a high cardinality section of the data store in response to a determination that the value from the query is absent in the first list of tokens, where tokens in the second list of tokens represent values in data records having high cardinality.

20. The method of claim 19, wherein the retrieving the one or more data records from the data section comprises:

loading at least one batch identified in the particular list of batch identifiers corresponding to the token matching the value from the query;

uncompressing the at least one batch;

identifying a record having a key-value pair matching the value from the query; and outputting the record.

21. The method of claim 19, further comprising reporting the particular list of batch identifiers to a user.

22. The method of claim 19, further comprising:

determining whether the value from the query is present in the second list of tokens;

retrieving a particular list of batch identifiers from the second list of tokens, where the particular list of batch identifiers corresponds to a token matching the value from the query; and retrieving one or more data records from a data section of the data store using the particular list of batch identifiers, where the retrieval of the one or more data records is in response to a determination that the value from the query is present in the second list of tokens.

23. The method of claim 19, further comprising retrieving another data segment in response to a determination that the value from the query is absent in the first list of tokens and the second list of tokens.

24. The method of claim 19, wherein the key-value pairs includes one of (i) a key value, (ii) a field value, or both (i) and (ii).

25. The method of claim 19, wherein the cardinality of a value is determined by at least one of (i) a number of records within the data segment, and (ii) a sample of records from a different data segment.

26. The method of claim 19, further comprising:

splitting the value into a plurality of values;

determining whether the each of the values is present in the first list of tokens;

loading the second list of tokens in response to a determination that at least one of the values is absent in the first list of tokens; and determining whether the at least one of the values is present in the second list of tokens.

* * * * *